US010160561B2

(12) United States Patent
Nakamoto

(10) Patent No.: US 10,160,561 B2
(45) Date of Patent: Dec. 25, 2018

(54) RELAY DEVICE

(71) Applicant: TOYO JIDOKI CO., LTD., Tokyo (JP)

(72) Inventor: Kakue Nakamoto, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 15/906,957

(22) Filed: Feb. 27, 2018

(65) Prior Publication Data

US 2018/0251246 A1    Sep. 6, 2018

(30) Foreign Application Priority Data

Mar. 1, 2017   (JP) .................................. 2017-038771

(51) Int. Cl.
*B65B 43/48* (2006.01)
*B65B 43/52* (2006.01)
(Continued)

(52) U.S. Cl.
CPC ............ *B65B 35/205* (2013.01); *B65B 43/48* (2013.01); *B65B 43/52* (2013.01); *B65G 47/082* (2013.01);
(Continued)

(58) Field of Classification Search
CPC ............................ B65B 35/205; B65G 47/082
(Continued)

(56) References Cited

U.S. PATENT DOCUMENTS 3,522,942 A * 8/1970 Hepp ..................... B65H 39/02
                                                  198/346
3,690,435 A * 9/1972 King .................... B65G 47/647
                                                  198/463.3
(Continued)

FOREIGN PATENT DOCUMENTS

| EP | 1634827 A1 | 3/2006 |
| JP | 62-275915 A | 11/1987 |
| JP | 10-310230 A | 11/1998 |

OTHER PUBLICATIONS

Extended European Search Report EP Application No. 18159034.0 dated Jul. 20, 2018.

*Primary Examiner* — Douglas A Hess
(74) *Attorney, Agent, or Firm* — Pillsbury Winthrop Shaw Pittman, LLP

(57) ABSTRACT

Provided is a relay device capable of moving objects to be conveyed from a conveying section of a continuous conveying system to a conveying section of an intermittent conveying system in various modes. The relay device includes: a first conveying section that conveys the objects to be conveyed, continuously in a forward direction in a first direction; a second conveying section that transfers a plurality of assembly sections intermittently in the forward direction in the first direction; a relay conveying section provided between the first conveying section and the second conveying section; and a relay driving section that moves the relay conveying section in the first direction. The relay driving section moves the relay conveying section in the forward direction in the first direction, at the same speed as a speed at which the plurality of objects are conveyed in the forward direction of the first direction by the first conveying section, at least while the first pusher moves the plurality of objects in the forward direction of the second direction.

19 Claims, 28 Drawing Sheets

(51) Int. Cl.
  *B65G 47/52* (2006.01)
  *B65G 47/66* (2006.01)
  *B65G 47/82* (2006.01)
  *B65B 35/20* (2006.01)
  *B65G 47/08* (2006.01)

(52) U.S. Cl.
  CPC ............. *B65G 47/52* (2013.01); *B65G 47/66* (2013.01); *B65G 47/82* (2013.01); *B65G 2201/0238* (2013.01)

(58) Field of Classification Search
  USPC .................... 198/346.2, 370.07, 456, 468.11
  See application file for complete search history.

(56) References Cited

U.S. PATENT DOCUMENTS

| | | | | |
|---|---|---|---|---|
| 3,815,723 A * | 6/1974 | Wright | ................... | B65G 47/50 198/357 |
| 3,822,777 A * | 7/1974 | Jepsen | ................ | B65G 19/303 198/370.07 |
| 4,658,947 A * | 4/1987 | Welder | ................... | B65G 47/54 198/346.2 |
| 5,038,916 A * | 8/1991 | Quilliou | ................. | F25D 25/04 198/429 |
| 5,065,678 A * | 11/1991 | Rhodes | ...................... | B61J 1/10 104/130.09 |
| 5,299,680 A * | 4/1994 | Rhodes | ................... | B61B 10/04 104/172.2 |
| 5,372,241 A * | 12/1994 | Matsumoto | ............ | B65G 37/02 198/463.2 |
| 5,456,058 A * | 10/1995 | Ziegler | ................... | B65B 5/106 53/157 |
| 5,628,614 A * | 5/1997 | Pazdernik | .............. | B65G 43/08 198/430 |
| 5,826,694 A * | 10/1998 | Kim | ...................... | G01B 5/0028 198/346.2 |
| 6,216,847 B1 * | 4/2001 | Schmidt | ................. | B65G 47/53 198/463.3 |
| 6,336,546 B1 * | 1/2002 | Lorenz | ............. | H01L 21/67727 198/346.2 |
| 6,607,068 B1 * | 8/2003 | Walther | ................ | B65G 17/323 198/456 |
| 6,993,889 B2 * | 2/2006 | Ford | ....................... | B65B 5/106 53/237 |
| 9,085,421 B2 * | 7/2015 | Ford | ................... | B65G 47/8823 |
| 2015/0368048 A1 | 12/2015 | Benz | | |
| 2018/0044120 A1 * | 2/2018 | Mader | | |

* cited by examiner

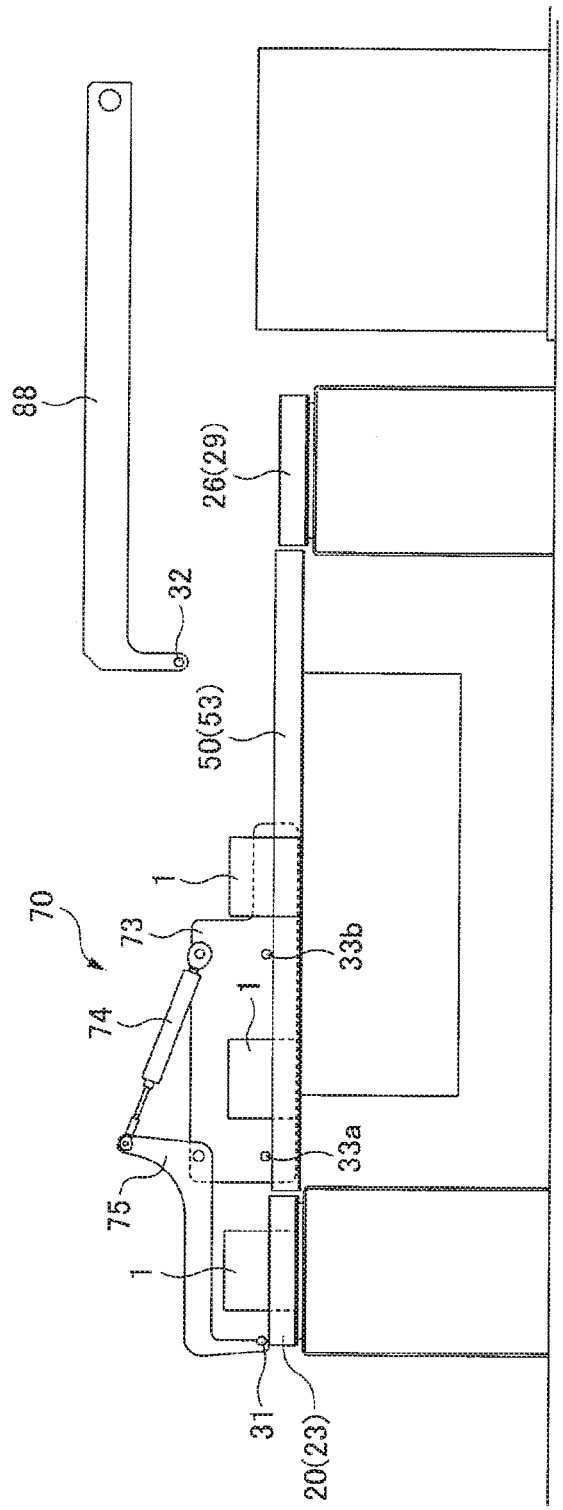
FIG. 20
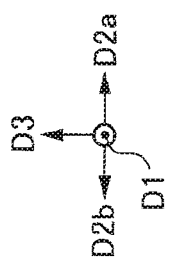

RELAY DEVICE

CROSS-REFERENCE TO RELATED APPLICATIONS

This application is based upon and claims the benefit of priority from Japanese Patent Application No. 2017-38771, filed on Mar. 1, 2017; the entire contents of which are incorporated herein by reference.

TECHNICAL FIELD

The present invention relates to a relay device for receiving objects to be conveyed from a conveying section of a continuous conveying system and transferring the objects to a conveying section of an intermittent conveying system.

BACKGROUND ART

In a bucket conveyor, a plurality of buckets (or accommodating sections) on which objects to be conveyed are placed are disposed at regular intervals, and a conveyor belt is made to travel, whereby the objects are conveyed together with the buckets. In a case where objects to be conveyed are manually placed on the accommodating sections in such a conveyor, in general, the operator can place the objects on the accommodating sections more easily when the accommodating sections are continuously moved at a constant speed than when the accommodating sections are intermittently moved or are moved with the conveying speed varied. In a case where the accommodating sections are intermittently moved or are moved with the conveying speed varied, it is difficult to judge the timing for placing the objects, and the operator may fail to place the objects on appropriate accommodating sections or may contact with the accommodating sections by mistake.

Thus, in a case of manually disposing objects on the accommodating sections, it is preferable to continuously move the accommodating sections at a constant speed. On the other hand, however, in a packing device for accommodating objects to be conveyed in packaging bags, it may be necessary to intermittently stop the objects to be conveyed. In that situation, it is necessary to transfer the objects from a conveying device of a continuous conveying system for continuously moving the objects to a conveying device of an intermittent conveying system for intermittently moving the objects.

As a device for transferring objects to be conveyed between devices of different conveying systems, there has been known a relay device disclosed in Japanese patent application publication No. 10-310230. The relay device of Japanese patent application publication No. 10-310230 comprises an endless relay bucket conveyor, wherein articles received from an intermittent conveying conveyor are conveyed in the state of being accommodated in buckets and the articles are transferred from the buckets to a continuous conveying conveyor.

SUMMARY OF INVENTION

Technical Problem

Each bucket used in the relay device of Japanese patent application publication No. 10-310230 must have a size suited to the size and state of an object to be conveyed. When the size and/or state of an object to be conveyed are changed, therefore, it is necessary to replace the buckets. The bucket replacement requires labor and time, and it requires various kinds of buckets to be preliminarily stocked. In these points, the relay device of Japanese patent application publication No. 10-310230 is inconvenient.

In addition, in the relay device of Japanese patent application publication No. 10-310230, the state of objects to be conveyed cannot be changed. For example, in the relay device of Japanese patent application publication No. 10-310230, the state (for example, the number and posture) of articles received from an upstream-side device (corresponding to the intermittent conveying conveyor in Japanese patent application publication No. 10-310230) and the state of the articles transferred to accommodating sections of a downstream-side device (corresponding to the continuous conveying conveyor in Japanese patent application publication No. 10-310230) are the same with each other, and both of them cannot be made different. Besides, in a case of disposing a plurality of kinds of articles on the accommodating sections of the downstream-side device, in the relay device of Japanese patent application publication No. 10-310230, the plurality of kinds of articles must be preliminarily accommodated in one bucket of the upstream-side device. However, it is not necessarily easy to appropriately accommodate a plurality of kinds of articles in one bucket manually, and therefore, a mistake in the accommodating operation is liable to occur, and the accommodation needs great care.

Further, in the relay device of Japanese patent application publication No. 10-310230, though relay of the objects transferred from a conveyor of the intermittent conveying system to a conveyor of the continuous conveying system can be performed, it is impossible to perform relay of the objects transferred from the conveyor of the continuous conveying system to the conveyor of the intermittent conveying system.

The present invention has been contrived in light of the above-mentioned circumstances, and an object thereof is to provide a technology by which objects to be conveyed can be transferred from a conveying section of a continuous conveying system to a conveying section of an intermittent conveying system in various modes.

Solution to Problem

One aspect of the present invention is directed to a relay device comprising: a first conveying section that conveys a plurality of objects to be conveyed, continuously in a forward direction of a first direction; a second conveying section that conveys a plurality of assembly sections, intermittently in the forward direction of the first direction; a relay conveying section provided between the first conveying section and the second conveying section with respect to a second direction perpendicular to the first direction; a relay driving section that moves the relay conveying section in the forward direction and a reverse direction of the first direction; a first pusher that moves two or more of the plurality of objects conveyed by the first conveying section, in a forward direction of the second direction, so as to dispose the two or more objects on the relay conveying section; and a second pusher that moves the two or more objects in the forward direction of the second direction after the two or more objects are disposed on the relay conveying section by the first pusher, so as to dispose the two or more objects on one or more of the plurality of assembly sections, wherein the relay driving section moves the relay conveying section in the forward direction of the first direction, at a same speed as a speed at which the plurality of objects are conveyed in the forward direction of the first direction by the first conveying section, at least while the first pusher is moving the two or more objects in the forward direction of the second direction.

The relay device may be configured as follows: the relay conveying section has a plurality of introducing passages, the first pusher disposes the two or more objects on the plurality of introducing passages, the second pusher moves the two or more objects in the forward direction of the second direction after the two or more objects are disposed on the plurality of introducing passages, so as to dispose the two or more objects on one or more of the plurality of assembly sections, and the relay driving section moves the plurality of introducing passages in the forward direction of the first direction, at a same speed as a speed at which the plurality of objects are moved in the forward direction of the first direction by the first conveying section, at least while the first pusher is moving the two or more objects in the forward direction of the second direction.

The relay device may further comprises a relay pusher that moves the two or more objects disposed on the plurality of introducing passages, in the forward direction of the second direction.

The relay device may be configured as follows: the relay conveying section further has a junction passage where the plurality of introducing passages merge, the relay pusher assembles the two or more objects disposed on the plurality of introducing passages, onto the junction passage, so as to dispose the two or more objects together, and the second pusher moves the two or more objects disposed together on the junction passage, in the forward direction of the second direction so as to dispose the two or more objects together on one of the plurality of assembly sections.

The relay device may further comprises a first pusher driver that moves the first pusher in the second direction and in a height direction perpendicular to each of the first direction and the second direction, wherein: while the first pusher is moved in the forward direction of the second direction, the first pusher driver disposes the first pusher at a position in the height direction where the first pusher makes contact with the two or more objects, and while the first pusher is moved in the reverse direction of the second direction, the first pusher driver raises the first pusher above the two or more objects and then lowers the first pusher to a position below height of the two or more objects.

The first pusher and the relay pusher may be connected with each other and operate in conjunction with each other.

The relay device may further comprises a first pusher driver that moves the first pusher and the relay pusher in the second direction and in a height direction perpendicular to each of the first direction and the second direction, wherein: while the first pusher and the relay pusher are moved in the forward direction of the second direction, the first pusher driver disposes the first pusher and the relay pusher at positions in the height direction such that the first pusher makes contact with two or more objects and the relay pusher makes contact with other two or more of the objects, and while the first pusher and the relay pusher are moved in the reverse direction of the second direction, the first pusher driver raises the first pusher and the relay pusher above the two or more objects and then lowers the first pusher and the relay pusher to positions below height of the two or more objects.

The relay device may further comprises a second pusher driver that moves the second pusher in the second direction and in a height direction perpendicular to each of the first direction and the second direction, wherein: while the second pusher is moved in the forward direction of the second direction, the second pusher driver disposes the second pusher at a position in the height direction such that the second pusher makes contact with the two or more objects, and while the second pusher is moved in the reverse direction of the second direction, the second pusher driver raises the second pusher above the two or more objects and then lowers the second pusher to a position below height of the two or more objects.

The relay device may be configured as follows: the first conveying section has a plurality of side guides that are disposed so as to leave space between the plurality of side guides in the first direction, and each of the plurality of side guides extends in the second direction, each of the plurality of objects is disposed on an accommodating space partitioned by adjacent ones of the plurality of side guides, and while the two or more objects are moved by the first pusher, the plurality of side guides guide the two or more objects in the forward direction of the second direction.

The relay device may be configured as follows: the relay driving section moves the relay conveying section in the first direction so as to dispose the relay conveying section at a first synchronous conveying position and at a second synchronous conveying position downstream of the first synchronous conveying position with respect to the forward direction of the first direction, while the relay conveying section is moved from the first synchronous conveying position to the second synchronous conveying position, the first pusher disposes the two or more objects on the relay conveying section, and the second pusher moves the two or more objects in the forward direction of the second direction so as to dispose the two or more objects on one or more of the plurality of assembly sections, in a state in which the relay conveying section is disposed at the second synchronous conveying position.

The first pusher and the relay pusher may be connected to the relay conveying section and are moved in an integrated fashion, together with the relay conveying section, with respect to the first direction.

According to the present invention, objects to be conveyed are appropriately transferred from a first conveying section of a continuous conveying system to a relay conveying section, and the objects are appropriately transferred from the relay conveying section to assembly sections of a second conveying section of an intermittent conveying system. Thus, with the relay conveying section provided intermediately between the first conveying section and the second conveying section, the objects to be conveyed can be transferred from the conveying section of the continuous conveying system to the conveying section of the intermittent conveying system in a variety of modes.

BRIEF DESCRIPTION OF DRAWINGS

FIG. 20 is a side view showing general configuration of the pusher driving system of the relay device, illustrating change in the state of the pusher driving system over time.

DESCRIPTION OF EMBODIMENTS

Figure 1:
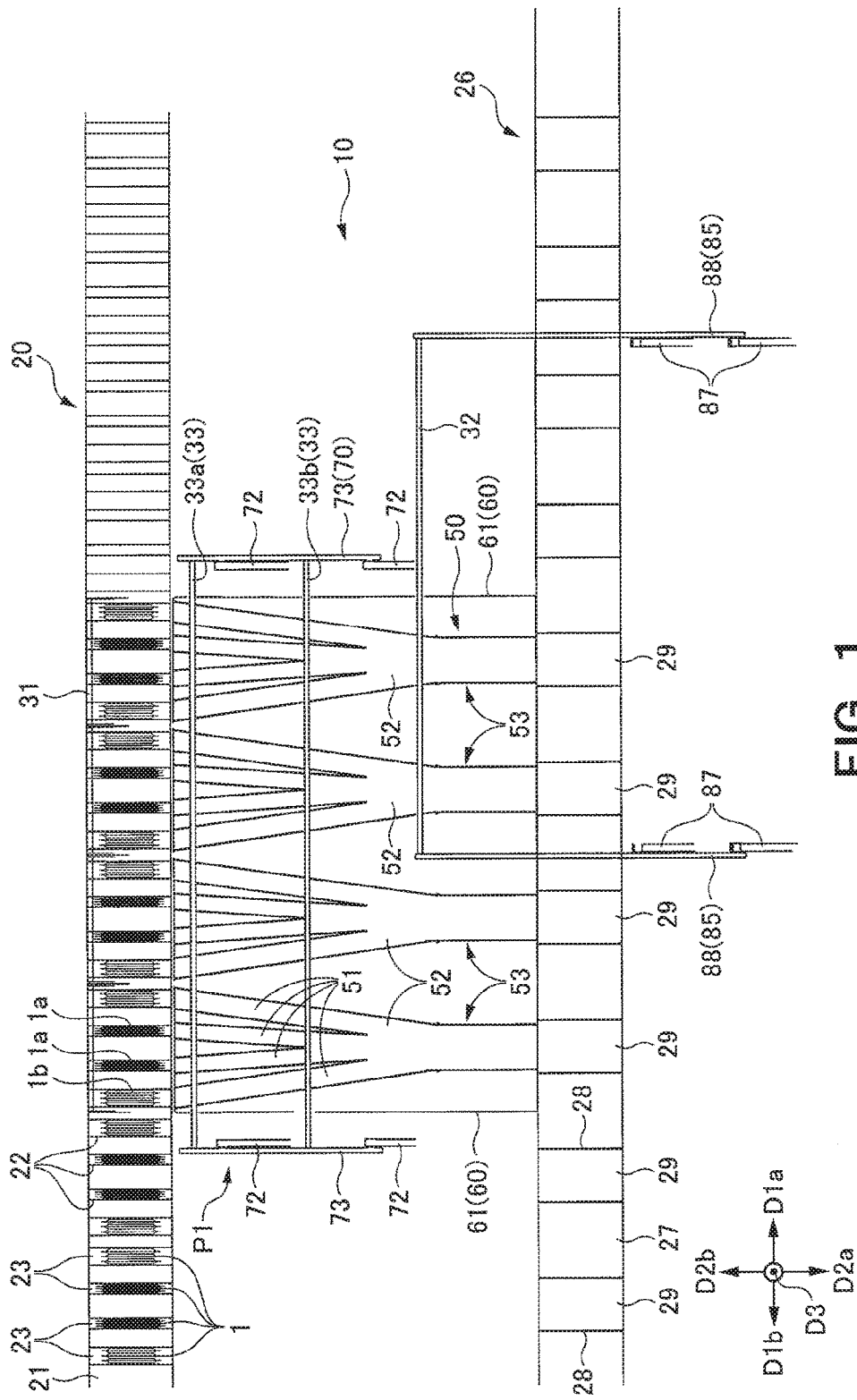
FIG. 1 is a plan view showing general configuration of a relay device according to one embodiment of the present invention, illustrating change in the state of the relay device over time.

One embodiment of the present invention will be described below, referring to the drawings.

FIGS. 1 to 11 are plan views showing general configuration of a relay device 10 according to one embodiment of the present invention, illustrating change in the state of the relay device 10 over time.

Figure 12:
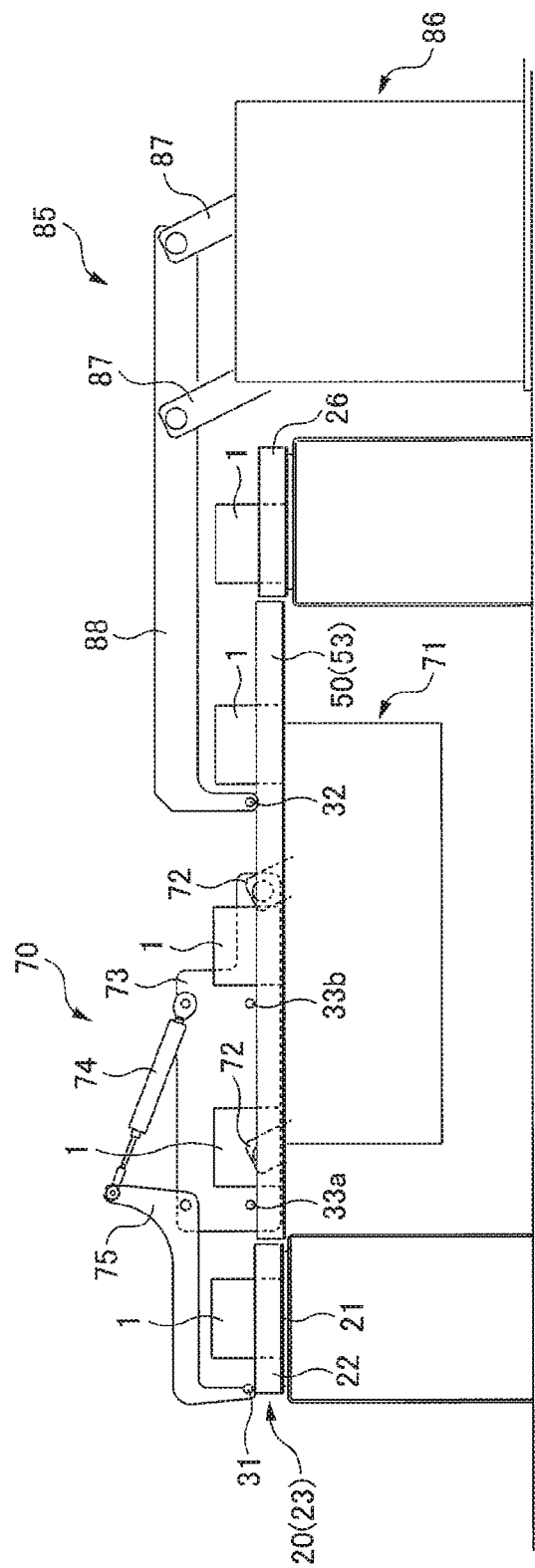
FIG. 12 is a side view showing general configuration of a pusher driving system of the relay device, illustrating main elements of the pusher driving system.
Figure 13:
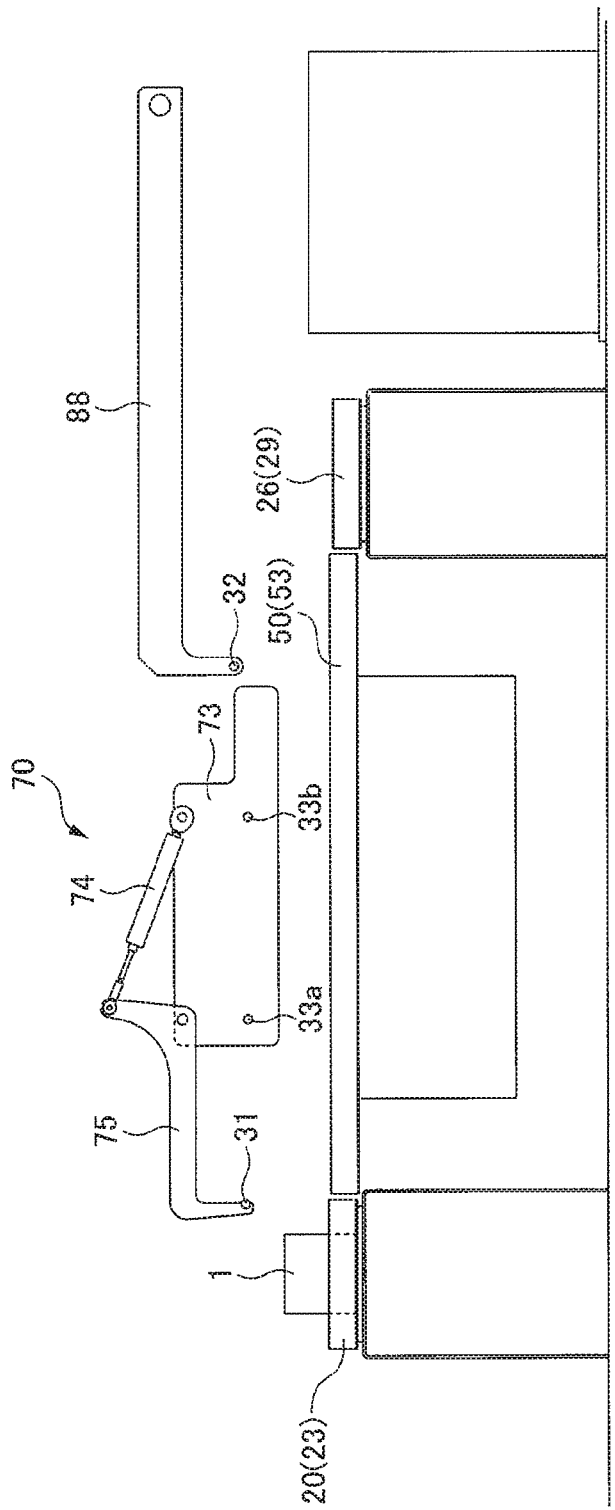
FIG. 13 is a side view showing general configuration of the pusher driving system of the relay device, illustrating change in the state of the pusher driving system over time.
Figure 14:
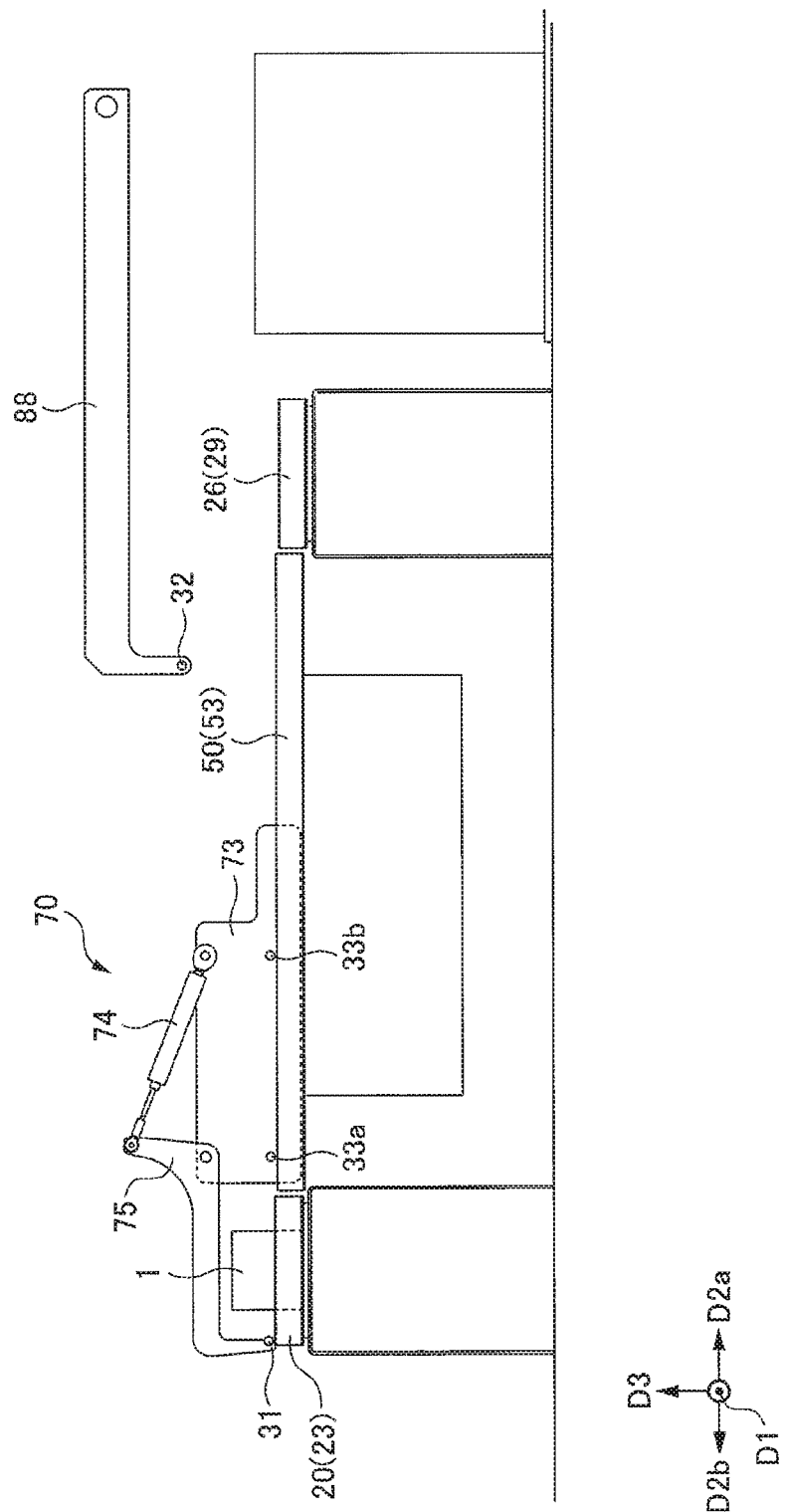
FIG. 14 is a side view showing general configuration of the pusher driving system of the relay device, illustrating a time change in the state of the pusher driving system.
Figure 15:
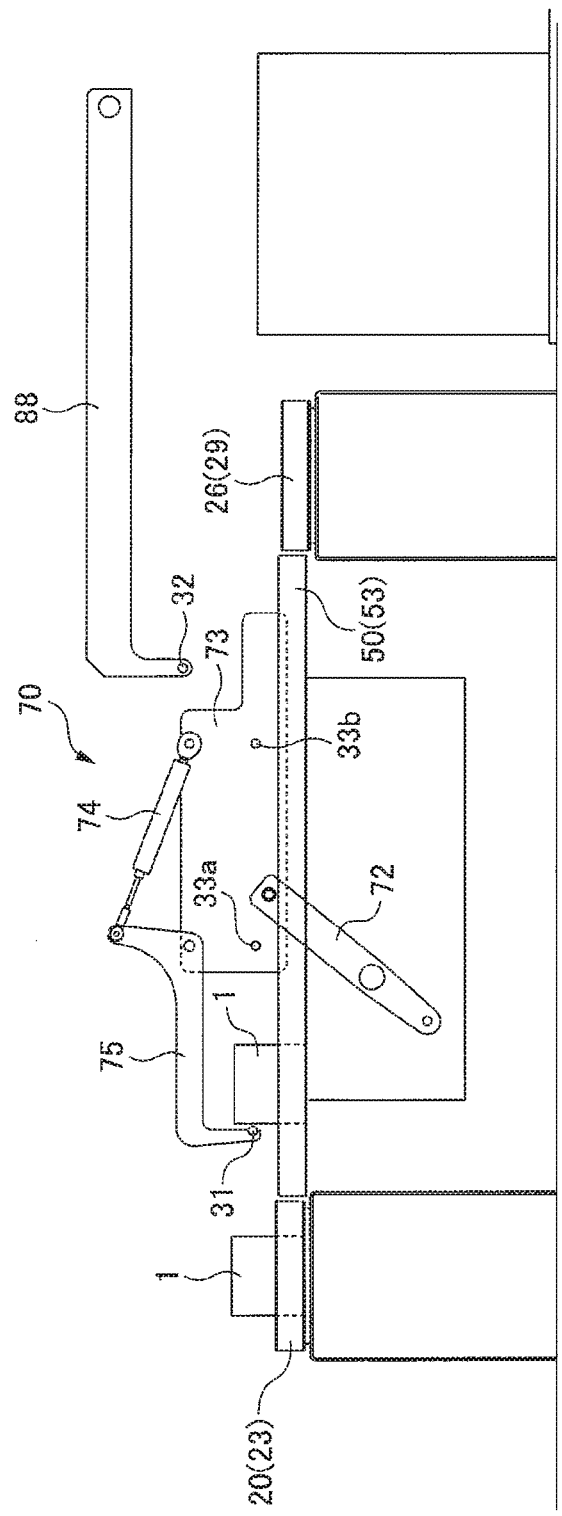
FIG. 15 is a side view showing general configuration of the pusher driving system of the relay device, illustrating change in the state of the pusher driving system over time.
Figure 16:
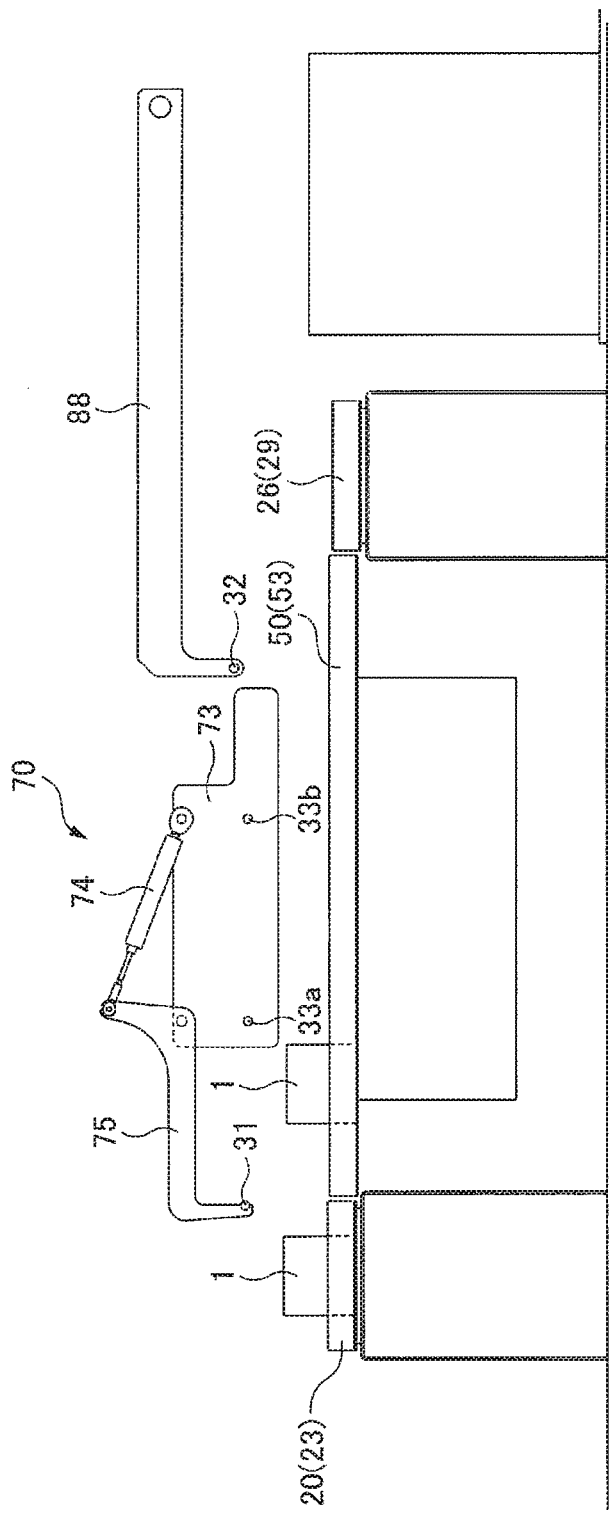
FIG. 16 is a side view showing general configuration of the pusher driving system of the relay device, illustrating change in the state of the pusher driving system over time.
Figure 17:
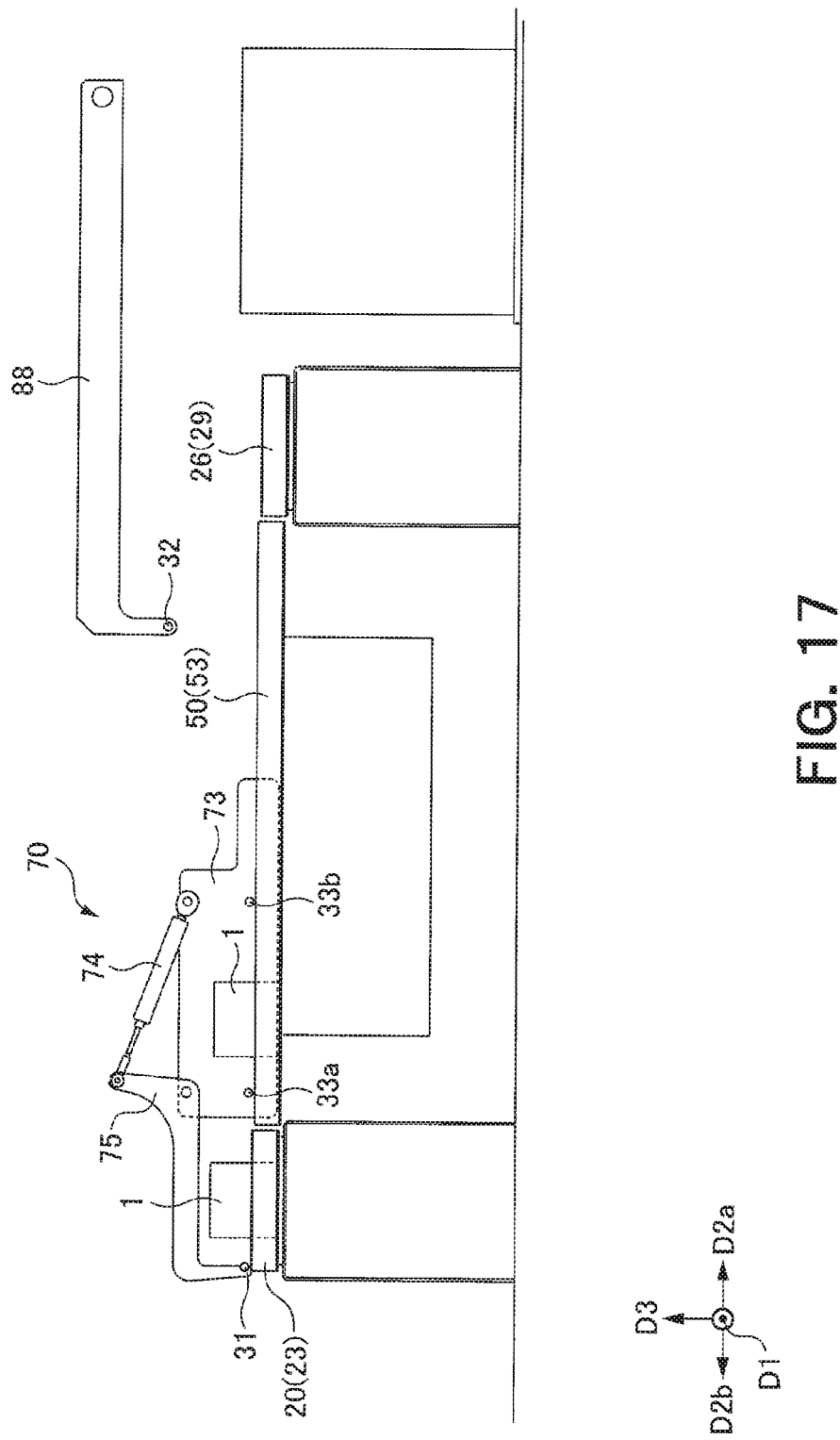
FIG. 17 is a side view showing general configuration of the pusher driving system of the relay device, illustrating change in the state of the pusher driving system over time.

FIGS. 12 to 23 are side views showing general configuration of a pusher driving system of the relay device 10, in which FIG. 12 illustrates main elements of the pusher driving system, and FIGS. 13 to 23 illustrate schematically change in the state of the pusher driving system over time.

FIGS. 24 to 28 are side views showing general configurations of a relay driving section 60 and a first pusher driver 70, illustrating change in the state of the first pusher driver 70 over time.

Note that in FIGS. 1 to 28, for showing the layout of elements which cannot be seen externally, such elements may be illustrated conceptually. In addition, in FIGS. 1 to 28, some of the elements may be omitted from illustration, for easier understanding.

In the following description, the direction corresponding to the left-right direction in FIG. 1 will be referred to as a first direction D1, the direction corresponding to the vertical direction in FIG. 1 will be referred to as a second direction D2, and the direction corresponding to the direction perpendicular to the paper surface of FIG. 1 will be referred to as a height direction D3. Therefore, the first direction D1, the second direction D2 and the height direction D3 are perpendicular to one another. In addition, the first direction D1 is a concept including both a first forward direction D1a and a first reverse direction D1b which will be described later, and the second direction D2 is a concept including both a second forward direction D2a and a second reverse direction D2b which will be described later.

[General Configuration of Relay Device]

As shown in FIG. 1, a relay device 10 includes a first conveying section 20, a second conveying section 26 and a relay conveying section 50 as devices for conveying and guiding objects 1 to be conveyed. The first conveying section 20 and the second conveying section 26 convey the objects 1 in a forward direction D1a of the first direction D1 (hereinafter referred to also as the "first forward direction D1a"). The relay conveying section 50 guides the objects 1 in a forward direction D2a of the second direction D2 (hereinafter referred to also as the "second forward direction D2a") while conveying the objects 1 in the first forward direction D1a. On the upstream side in regard of the conveying direction of the first conveying section 20, the objects 1 are placed on the first conveying section 20 one after another, manually or through a machine. On the other hand, a packaging device (omitted from illustration) is provided on the downstream side in regard of the conveying direction of the second conveying section 26, and each of the objects 1 conveyed by the second conveying section 26 is accommodated and packaged in a bag by the packaging device.

Besides, the relay device 10 includes a first pusher 31, a second pusher 32 and a relay pusher 33 as devices for transferring the objects 1 in the second forward direction D2a. The first pusher 31, the second pusher 32 and the relay pusher 33 are provided to be reciprocatable with respect to the second direction D2 and the height direction D3, and cooperate with one another in gradually transferring the objects in the second forward direction D2a.

The type and number of elements constituting each object 1 are not particularly limited. In this embodiment, each object 1 includes a plurality of small bags, and is disposed in each accommodating space 23 of the first conveying section 20 in a state in which the plurality of small bags are aligned in the first direction D1. In addition, one set of article group finally placed on each assembly section 29 of the second conveying section 26 is constituted of a plurality (in this embodiment, "four") of objects 1. The type and size of the objects 1 included in one set of article group may be the same as or different from one another. In the relay device 10 shown in FIG. 1, two types of objects 1 are included in one set of article group, the objects 1a of a first type are disposed in the center, and the objects 1b of a second type are disposed on both end sides.

<First Conveying Section>

The first conveying section 20 is configured as a conveying section of a continuous conveying system for conveying a plurality of objects 1 continuously at a fixed speed in the first forward direction D1a, and moves the objects 1 at a constant speed. The first conveying section 20 shown in FIG. 1 has an endless form conveyor belt 21, and a plurality of side guides 22 disposed on a front surface side of the conveyor belt 21. The conveyor belt 21 is driven by a drive source (omitted from illustration) such as a motor, and travels continuously in the first forward direction D1a.

Each side guide 22 is fixed to the conveyor belt 21 while extending in the second direction D2, and the side guides 22 disposed adjacently in the first direction D1 are disposed spaced from each other. Each of the plurality of objects 1 to be conveyed is placed on the conveyor belt 21 in an accommodating space 23 partitioned by two side guides 22 disposed adjacently. In the first conveying section 20 illustrated in FIG. 1, regions where the objects 1 are disposed (namely, the accommodating spaces 23) and regions where no object is disposed are provided alternately in the first direction D1. Therefore, between the objects 1 disposed adjacently to each other on the conveyor belt 21, there is provided a space corresponding to a region where no object 1 is disposed.

Each side guide 22 restricts the position in regard of the first direction D1 of the object 1 disposed in the accommodating space 23, and guides two or more objects 1 in the second forward direction D2a when the two or more objects 1 are moved by pushing by the first pusher 31 as will be described later. Each side guide 22 in this embodiment makes contact with an object 1 disposed in the accommodating space 23, and supports this object 1 from lateral sides. It is to be noted, however, that each side guide 22 may not necessarily be in contact with an object 1 disposed in the accommodating space 23 as long as each side guide 22 is provided in a position enabling to restrict the layout of the object 1 in regard of the first direction D1.

Each side guide 22 can be disposed at an arbitrary position in regard of the first direction D1, and the spacing between the adjacent side guides 22 (namely, the size of each accommodating space 23 in the first direction D1) can be controlled flexibly. Therefore, each object 1 may be disposed in the accommodating space 23 of an optimum size, by controlling the spacing between the side guides 22 according to the size of the object 1 (namely, the size and number of the small bags). In this way, the sizes of the accommodating spaces 23 may be the same or different from one another. For example, in the case where each object 1 includes the same number of small bags of a single size, the sizes of the accommodating spaces 23 may be the same as one another. On the other hand, in the case where the size of the small bags differs from object 1 to object 1 or where the number of the small bags differs from object 1 to object 1, the sizes of the accommodating spaces 23 may be different from one another.

In this way, the side guides 22 are disposed to have positions and spacings such that the object 1 can keep a desired posture in each accommodating space 23. It is to be noted, however, that the position of each side guide 22 and the position of each accommodating space 23 are controlled in such a manner that openings of the accommodating spaces 23 can be disposed in positions corresponding to openings of a plurality of introducing passages 51 possessed by the relay conveying section 50 which will be described later. In addition, the position of the side guide 22 is controlled in such a manner that the opening of each accommodating space 23 is smaller than the opening of the corresponding introducing passage 51.

<Second Conveying Section>

The second conveying section 26 is configured as a conveying section of an intermittent conveying system for transferring a plurality of assembly sections 29 intermittently in the first forward direction D1a, and conveys the objects accommodated on the plurality of assembly sections 29 from the upstream side toward the downstream side (namely, in the first forward direction D1a) by repeating movement and stoppage. The second conveying section 26 includes an endless form conveyor belt 27, and a plurality of side guides 28 disposed on a front surface side of the conveyor belt 27. The conveyor belt 27 is driven by a drive source (omitted from illustration) such as a motor, and travels intermittently in the first forward direction D1a. Each side guide 28 is fixed to the conveyor belt 27 while extending in the second direction D2, and the side guides 28 disposed adjacently in the first direction D1 are disposed spaced from each other. An article group constituted of a plurality of objects 1 is disposed on the conveyor belt 27, specifically, on each assembly section 29 partitioned by two side guides 28 disposed adjacently. In the second conveying section 26 shown in FIG. 1, regions where the article groups are disposed (namely, the assembly sections 29) and regions where no article group is disposed are provided alternately in the first direction D1. Therefore, between the article groups disposed adjacently on the conveyor belt 27, there is provided a space corresponding to the region where no article group is disposed.

The side guides 28 in this embodiment are disposed at regular intervals in regard of the first direction D1, and the assembly sections 29 partitioned by the side guides 28 have a fixed size in regard of the first direction D1. Particularly, the positions of each side guide 28 and each assembly section 29 are controlled in such a manner that the openings of the assembly sections 29 can be disposed in positions corresponding to openings of a plurality of junction passages 52 possessed by the relay conveying section 50. In addition, the position of each side guide 28 is controlled in such a manner that the opening of each assembly section 29 is larger than the opening of the corresponding junction passage 52.

The plurality of assembly sections 29 are transferred intermittently at a fixed pitch number in the first forward direction D1a. The "pitch number" here means the number of pitches corresponding to a distance by which the assembly section 29 is transferred by one-time intermittent movement (hereinafter referred to also as the "intermittent moving distance"). The "pitch" means the spacing (namely, the distance in the first direction D1) between the accommodating sections 29 accommodating the article groups that are disposed adjacently in the second conveying section 26. Therefore, there is established the relation: "(intermittent moving distance)=pitch×(pitch number)." While the pitch number can be set at an arbitrary integer, it is preferably set at an integer the upper limit of which is the number of relay conveying passages 53 (namely, the number of the junction passages 52) possessed by the relay conveying section 50, and more preferably set at an integer of not less than one that is obtained by dividing the number of the relay conveying passage 53 possessed by the relay conveying section 50 by an integer of not less than one.

In the relay device 10 shown in FIG. 1, the number of the relay conveying passages 53 (namely, the number of the junction passages 52) is "four." Therefore, where the "pitch" is assumed to be "100 mm," the "intermittent moving distance" is preferably set at one of 100, 200, 300 and 400 mm (practically, 100, 200 and 400 mm). In the case where the intermittent moving distance is "400 mm" (namely, where the pitch number is equal to the number of the relay conveying passage 53 (namely, where the "pitch number=4"), it is sufficient that an intermittent cycle of the second conveying section 26 inclusive of one-time intermittent movement is conducted once in one cycle of reciprocation of the relay conveying section 50 in the first direction D1. On the other hand, in the case where the intermittent moving distance is "200 mm" (namely, where the pitch number is one half the number of the relay conveying passages 53 (namely, where the "pitch number=2"), it is sufficient that the aforementioned intermittent cycle of the second conveying section 26 is conducted twice in one cycle of reciprocation of the relay conveying section 50 in the first direction D1. Similarly, in the case where the intermittent moving distance is "100 mm" (namely, where the "pitch number=1"), it is sufficient that the aforementioned intermittent cycle of the second conveying section 26 is conducted four times in one cycle of reciprocation of the relay conveying section 50 in the first direction D1.

In this way, the assembly sections 29 need only be moved in the first forward direction D1a by not less than the distance (preferably, by the distance) represented by "(number of relay conveying passages 53 (namely, number of junction passages 52))×pitch" in one cycle of reciprocation of the relay conveying section 50 in the first direction D1. By this, empty assembly sections 29 can be disposed in positions corresponding to the openings of the junction passages 52 of the relay conveying passage 53, and the article groups can be transferred from the respective junction passages 52 to the empty assembly sections 29.

<Relay Conveying Section>

The relay conveying section 50 includes a plurality (in this embodiment, "four") of relay conveying passages 53 that are provided between the first conveying section 20 and the second conveying section 26 in regard of the second direction D2 and are provided aligned in the first direction D1. Each relay conveying passage 53 has a plurality (in this embodiment, "four") of introducing passages 51, and the junction passage 52 where the plurality of introducing passages 51 merge. Each introducing passage 51 is disposed adjacently to the first conveying section 20, and the junction passage 52 is disposed adjacently to the second conveying section 26.

The plurality of introducing passages 51 possessed by each relay conveying passage 53 guide in the second forward direction D2a, while individually accommodating, the plurality of objects 1 to be conveyed (in this embodiment, four objects 1 to be conveyed) constituting one set of article group finally placed on one assembly section 29 of the second conveying section 26. The plurality of introducing passages 51 connected to each junction passage 52 are disposed in such a manner that they are gradually closer to each other more on the downstream side, and function as guide rails to each junction passage 52.

Each junction passage 52 guides in the second forward direction D2a, while collectively accommodating, the plurality of objects 1 constituting one set of article group sent from the plurality of introducing passages 51. Note that the plurality of introducing passages 51 connected to each junction passage 52 may merge at a single place, or may merge through a plurality of stages. In the relay conveying section 50 shown in FIG. 1, of the four introducing passages 51 possessed by each relay conveying passage 53, the two introducing passages 51 disposed in the center merge first to form an intermediate junction passage, and, on the downstream side thereof, the intermediate junction passage and the two introducing passages 51 disposed at both ends merge.

Each object 1 to be conveyed is transferred from the first conveying section 20 toward the second conveying section 26 through the aforementioned introducing passage 51 and junction passage 52. In this instance, the plurality of objects 1 constituting one set of article group are brought closer to one another as they proceed through the introducing passages 51 from the upstream side toward the downstream side, are assembled in the junction passage 52, and are placed on each assembly section 29 of the second conveying section 26 while being kept in the assembled state. Note that the sizes of each introducing passage 51 and each junction passage 52 are determined according to the objects 1 to be conveyed, and each introducing passage 51 and each junction passage 52 have such sizes as to be able to appropriately support and guide the corresponding objects 1. In each relay conveying passage 53 shown in FIG. 1, the introducing passage 51 having a size according to the objects 1b of the second type is disposed on each of both sides of the two introducing passages 51 having a side according to the objects 1a of the first type. In addition, the junction passage 52 (particularly, a part opening to the assembly section 29) has a size corresponding to a state in which the objects 1a of the first type and the objects 1b of the second type overlap with each other in the first direction D1.

The aforementioned relay conveying section 50 is provided to be reciprocatable in the forward direction D1a and the reverse direction D1b (hereinafter referred to also as the "first reverse direction D1b") of the first direction D1, and is moved in the first forward direction D1a and the first reverse direction D1*b* by a relay driving section 60. Specifically, the relay driving section 60 includes a moving body 61, and the relay conveying section 50 is fixedly supported by the moving body 61. With the moving body 61 moved in the first direction D1, the relay conveying section 50 (and, hence, the introducing passage 51 and the junction passage 52) is also moved in the first direction D1 together with the moving body 61. In this way, the relay driving section 60 moves the relay conveying section 50 in the first direction D1, and disposes the relay conveying section 50 at a first synchronous conveying position P1 (see FIG. 1) and at a second synchronous conveying position P2 (see FIG. 3) located on the downstream side of the first synchronous conveying position P1 in regard of the first forward direction D1*a*.

The first pusher 31 moves two or more objects 1 on the first conveying section 20 in the second forward direction D2*a* and disposes the two or more objects 1 on a plurality of introducing passages 51, while the relay conveying section 50 moves from the first synchronous conveying position P1 to the second synchronous conveying position P2. On the other hand, the second pusher 32 moves two or more objects 1 in the second forward direction D2*a* and disposes the two or more objects 1 on one or more of the plurality of assembly section 29, in a state in which the relay conveying section 50 is disposed at the second synchronous conveying position P2. Note that after the second pusher 32 moves the two or more objects 1 to one or more of the plurality of assembly sections 29, the relay driving section 60 moves the relay conveying section 50 in the first reverse direction D1*b* to again dispose the relay conveying section 50 at the first synchronous conveying position P1, and, thereafter, again moves the relay conveying section 50 in the first forward direction D1*a* from the first synchronous conveying position P1.

The relay driving section 60 in this embodiment moves the plurality of introducing passages 51 of the relay conveying section 50 in the first forward direction D1*a*, at the same speed as a speed at which the plurality of objects 1 are conveyed in the first forward direction D1*a* by the first conveying section 20, at least while the first pusher 31 is moving the two or more objects 1 in the second forward direction D2*a*. Specifically, at least while the first pusher 31 is moving the two or more objects 1 in the second forward direction D2*a*, the relay driving section 60 moves the relay conveying section 50 in the first forward direction D1*a* in such a manner that the openings of the accommodating spaces 23 where the two or more objects 1 moved by the first pusher 31 are disposed are disposed at positions corresponding to the openings of the plurality of introducing passages 51 of the relay conveying section 50, in a mutually facing manner.

<First Pusher>

The first pusher 31 moves two or more of the plurality of objects 1 conveyed by the first conveying section 20 in the second forward direction D2*a*, and disposes the two or more objects 1 on the plurality of introducing passages 51 of the relay conveying section 50. The first pusher 31 in this embodiment is comprised of a rod-shaped member (corresponding to a "first rod-shaped member") extending in the first direction D1. The rod-shaped member moves in the second forward direction D2*a* while keeping contact with two or more objects 1 to be conveyed, whereby the two or more objects 1 are pushed in the second forward direction D2*a*, and are disposed on a plurality of introducing passages 51. Note that the "rod-shaped member" here refers to a member of which the length in a certain direction (in this embodiment, the first direction D1) is larger than the lengths in other directions, and its specific shape is not particularly limited. While the first pusher 31 shown in FIG. 1 is composed of a single rod-shaped member, the first pusher 31 may be composed of a plurality of members.

The first pusher 31 shown in FIG. 1 extends in the first direction D1 so as to have a size not smaller than the range in the first conveying section 20 (particularly the range in the first direction D1) occupied by the objects 1 corresponding to the number of the introducing passages 51 possessed by the relay conveying section 50 (in this embodiment, "16 (=4×4) objects 1"). By this configuration, the first pusher 31 is capable of simultaneously pushing in the second forward direction D2*a* the objects 1 corresponding to the number of the introducing passages 51 possessed by the relay conveying section 50, and is capable of transferring the objects 1 from the corresponding accommodating spaces 23 to the corresponding introducing passages 51.

The first pusher 31 is driven by a first pusher driver 70, and is reciprocated in the second direction D2 and in the height direction D3. Particularly, the first pusher driver 70 in this embodiment disposes the first pusher 31 at such a position in the height direction that the first pusher 31 can make contact with two or more objects 1 disposed in the accommodating spaces 23 and on the introducing passages 51, while it moves the first pusher 31 in the second forward direction D2*a*. In addition, the first pusher driver 70 raises the first pusher 31 above the two or more objects 1 disposed on the first conveying section 20 and then lowers the first pusher 31 to a position below the height of the two or more objects 1, while it moves the first pusher 31 in the reverse direction D2*b* of the second direction D2 (hereinafter referred to also as the "second reverse direction D2*b*"). As a result, the first pusher 31 is moved from a position on the downstream side (namely, the second forward direction D2*a* side) of the objects 1 disposed on the first conveying section 20 (namely, in each accommodating space 23) to a position on the upstream side (namely, the second reverse direction D2*b* side) of the objects 1, without making contact (or interference) with the objects 1. The first pusher 31 repeats a series of these motions, whereby transfer of the objects 1 from the first conveying section 20 to the relay conveying section 50 can be repeated.

The first pusher driver 70 includes a pair of first reciprocating plates 73, and both ends of the first pusher 31 are connected to these first reciprocating plates 73. The first reciprocating plates 73 operate synchronously with each other, and assume postures which are the same with each other. According to movements of the first reciprocating plates 73 in the second direction D2 and the height direction D3, the first pusher 31 is moved in the second direction D2 and the height direction D3.

In addition, the first pusher 31 is connected to the relay conveying section 50 through the first pusher driver 70 and the relay driving section 60. Therefore, attendant on reciprocation of the relay conveying section 50 in the first direction D1 by the relay driving section 60, the first pusher 31 is also reciprocated in the first direction D1 together with the relay conveying section 50.

<Relay Pusher>

A relay pusher 33 moves two or more objects 1 disposed on a plurality of introducing passages 51 of the relay conveying section 50 in the second forward direction D2*a*, assembles the two or more objects 1 disposed on the plurality of introducing passages 51 on the junction passage 52, and disposes the two or more objects 1 together. The relay pusher 33 in this embodiment includes at least one rod-shaped member extending in the first direction D1, and the at least one rod-shaped member moves in the second forward direction D2a while keeping contact with two or more objects 1 to be conveyed, whereby the two or more objects 1 are pushed, assembled on the junction passage 52, and disposed together.

The relay pusher 33 shown in FIG. 1 includes a rod-shaped first relay pusher 33a (corresponding to a "second rod-shaped member") and a second relay pusher 33b (corresponding to a "third rod-shaped member"). The first relay pusher 33a and the second relay pusher 33b each extend in the first direction D1. The first relay pusher 33a is disposed on the upstream side of the second relay pusher 33b, with respect to the direction in which the two or more objects 1 are moved by the relay pusher 33 (namely, the second forward direction D2a). The first relay pusher 33a moves in the second forward direction D2a while keeping contact with two or more objects 1 disposed on the plurality of introducing passages 51, thereby to push and move the two or more objects 1 toward the downstream side (namely, in the second forward direction D2a). The second relay pusher 33b moves in the second forward direction D2a while keeping contact with the two or more objects 1 moved from the upstream side toward the downstream side by the first relay pusher 33a on the relay conveying section 50, thereby to push and further move the two or more objects 1 toward the downstream side.

Particularly in the relay device 10 shown in FIG. 1, the objects 1 to be conveyed are pushed to the position of the aforementioned intermediate junction passage by the first relay pusher 33a, and two objects 1 disposed on the two introducing passages 51 located in the center, of the four introducing passages 51 possessed by each relay conveying passage 53, are disposed together on the intermediate junction passage. Then, by the second relay pusher 33b, two objects 1 disposed on the two introducing passages 51 provided at both ends are pushed toward the downstream side, together with the two objects 1 disposed together on the intermediate junction passage, and these four objects 1 are disposed together on the junction passage 52 of the relay conveying section 50.

Each of the first relay pusher 33a and the second relay pusher 33b shown in FIG. 1 extend in the first direction D1 so as to have a size of not smaller than the range in the relay conveying section 50 (particularly the range in the first direction D1) occupied by the objects 1 corresponding to the number of the introducing passages 51 possessed by the relay conveying section 50 (in this embodiment, 16 (=4×4) objects 1). In other words, each of the first relay pusher 33a and the second relay pusher 33b extends in the first direction D1 so as to have a size of not smaller than the range of the relay conveying section 50 (particularly the range in the first direction D1) occupied by the introducing passages 51. By this configuration, each of the first relay pusher 33a and the second relay pusher 33b can simultaneously push in the second forward direction D2a, and transfer toward the downstream side, the objects 1 corresponding to the number of the introducing passages 51 possessed by the relay conveying section 50. Note that while each of the first relay pusher 33a and the second relay pusher 33b shown in FIG. 1 is composed of a single rod-shaped member, it may be composed of a plurality of members.

The aforementioned first pusher 31 and the relay pushers 33 (namely, the first relay pusher 33a and the second relay pusher 33b) are connected to one another and operate in conjunction with one another. Specifically, not only both ends of the first pusher 31 are connected, but also both ends of the relay pushers 33 (namely, the first relay pusher 33a and the second relay pusher 33b) are attached, to the aforementioned pair of first reciprocating plates 73 possessed by the first pusher driver 70. With this configuration, the first pusher driver 70 drives not only the first pusher 31 but also the relay pushers 33, and reciprocates both the first pusher 31 and the relay pushers 33 in the second direction D2 and the height direction D3.

Specifically, the first pusher driver 70 disposes the first pusher 31 and the relay pushers 33 at such positions in the height direction that the first pusher 31 makes contact with two or more objects 1 while the relay pushers 33 make contact with other two or more objects 1, while it moves the first pusher 31 and the relay pushers 33 in the second forward direction D2a. In addition, the first pusher driver 70 raises the first pusher 31 and the relay pushers 33 above two or more objects 1 disposed on the first conveying section 20 and the relay conveying section 50 (particularly, the introducing passages 51) and then lowers the first pusher 31 and the relay pushers 33 to positions below the height of the two or more objects 1, while it moves the first pusher 31 and the relay pushers 33 in the second reverse direction D2b.

Besides, the first pusher 31 and the relay pushers 33 are connected to the relay conveying section 50 through the first pusher driver 70 and the relay driving section 60 (namely, a pushing-in lever 75, the first reciprocating plate 73, a first connection member 72 and the moving body 61), and is reciprocated in regard of the first direction D1 as one body with the relay conveying section 50. In other words, the aforementioned relay driving section 60 reciprocates the first pusher 31 and the relay pushers 33 in the first direction D1 together with the relay conveying section 50.

Note that specific configurations of the relay driving section 60 and the first pusher driver 70 will be described later, referring to FIGS. 12 and 24.

<Second Pusher>

The second pusher 32 moves two or more objects 1 in the second forward direction D2a and disposes them on one or more of the plurality of assembly sections 29, after the two or more objects 1 are disposed on the plurality of introducing passages 51 by the first pusher 31. Specifically, the second pusher 32 transfers the objects 1 from the position on the relay conveying section 50 onto the second conveying section 26. More specifically, after the relay pusher 33 moves in the second reverse direction D2b and the relay pusher 33 is spaced from two or more objects 1 disposed together on the junction passage 52, the second pusher 32 makes contact with the two or more objects 1 disposed together on the junction passage 52 and moves in the second forward direction D2a. In this way, the second pusher 32 moves the two or more objects 1 disposed together on the junction passage 52 in the second forward direction D2a, and disposes the two or more objects 1 together on one of the plurality of assembly sections 29.

The second pusher 32 in this embodiment is composed of a rod-shaped member (corresponding to a "fourth rod-shaped member") extending in the first direction D1, and the rod-shaped member moves in the second forward direction D2a while keeping contact with two or more objects 1, whereby the two or more objects 1 are pushed out to, and placed on, one or more of the plurality of assembly sections 29 of the second conveying section 26.

The second pusher 32 shown in FIG. 1 extends in the first direction D1 so as to have a size of not smaller than the range in the relay conveying section 50 (particularly, the range in the first direction D1) occupied by the article groups (in this embodiment, four article groups) corresponding to the number of the relay conveying passages 53 (namely, the number of the junction passages 52) of the relay conveying section 50. In other words, the second pusher 32 extends in the first direction D1 so as to have a size of not smaller than the range in the relay conveying section 50 (particularly, the range in the first direction D1) occupied by the junction passages 52. With this configuration, the second pusher 32 can simultaneously push in the second forward direction D2a the article groups (in this embodiment, "four" article groups) corresponding to the number of the junction passages 52 possessed by the relay conveying section 50, and can transfer the article groups from the corresponding junction passages 52 to the corresponding assembly sections 29. Note that while the second pusher 32 shown in FIG. 1 is composed of a single rod-shaped member, the second pusher 32 may be composed of a plurality of members.

The second pusher 32 is driven by a second pusher driver 85, and is reciprocated in the second direction D2 and the height direction D3. Particularly, the second pusher driver 85 in this embodiment disposes the second pusher 32 at such a position in the height direction that the second pusher 32 makes contact with the article groups (namely, two or more objects 1) disposed on the junction passages 52, while it moves the second pusher 32 in the second forward direction D2a. In addition, the second pusher driver 85 raises the second pusher 32 above the article groups (namely, two or more objects 1) disposed on the junction passages 52 and then lowers the second pusher 32 to a position below the height of the article groups, while it moves the second pusher 32 in the second reverse direction D2b. As a result, the second pusher 3 is moved from a position on the downstream side (namely, on the second forward direction D2a side) of the article groups (namely, the objects 1) disposed on the junction passages 52 to a position on the upstream side (namely, the second reverse direction D2b side) of the article groups, without making contact (or interference) with the article groups. The second pusher 32 repeats a series of these motions, whereby transfer of the article groups from the relay conveying section 50 to the second conveying section 26 can be repeated.

The second pusher driver 85 in this embodiment includes a pair of second reciprocating plates 88, and both ends of the second pusher 32 are attached to these second reciprocating plates 88. According to movements of these second reciprocating plates 88 in the second direction D2 and the height direction D3, the second pusher 32 is moved in the second direction D2 and the height direction D3.

Note that specific configuration of the second pusher driver 85 will be described later, referring to FIG. 12.

<First Pusher Driver>

The configuration of the first pusher driver 70 will be described referring to FIGS. 12 and 24. Note that while in FIG. 12 a first driving box 71 is illustrated, in FIG. 24 the first driving box 71 is omitted from illustration, and devices and the like disposed inside the first driving box 71 are illustrated. The first pusher driver 70 that moves the first pusher 31 and the relay pushers 33 (namely, the first relay pusher 33a and the second relay pusher 33b) in the second direction D2 and the height direction D3 includes a drive source (not shown), a rotary shaft 77, a rotating block 76, a first connection member 72, a guide groove 78, the first reciprocating plates 73, an air cylinder 74 and a pushing-in lever 75, and constitutes a link mechanism.

To each of the aforementioned first reciprocating plates 73 are connected two sets of first driving mechanisms for moving the first reciprocating plate 73 in the second direction D2 and the height direction D3. Each of the first driving mechanisms includes a first driving section (not shown) composed of a motor, the rotating block 76 fixed to the rotary shaft 77 of the first driving section, and the first connection member 72 oscillatably connected to the rotating block 76.

To each first reciprocating plate 73, one-side end portions of the two first connection members 72 are oscillatably connected, at positions spaced from each other in regard of the second direction D2. The two sets of first driving mechanisms connected to each first reciprocating plate 73 operate in conjunction with each other, and the first reciprocating plates 73 included in these first driving mechanisms are so driven as to constantly assume postures which are the same with each other. By this, each first reciprocating plate 73 is reciprocated in the second direction D2 and the height direction D3, and, while the first reciprocating plate 73 is reciprocated, the first reciprocating plate 73 performs a translation motion in a plane defined by the second direction D2 and the height direction D3, without being inclined.

The rotary shaft 77 is fixed to one end side of the rotating block 76, and the first connection member 72 is oscillatably connected to the other end side of the rotating block 76. One end portion of each first connection member 72 is oscillatably connected to the first reciprocating plate 73, and the other end portion is slidably engaged with the guide groove 78 formed in the moving body 61. The guide groove 78 forms a slot extending in the height direction D3, and guides the other end portion of each first connection member 72 in the height direction D3. Each first connection member 72 is connected to the rotating block 76, between the part of connection to the first reciprocating plate 73 and the part of engagement with the guide groove 78. Therefore, each first connection member 72 oscillates attendant on rotation of the rotary shaft 77, assumes a posture according to the rotational position of the rotary shaft 77, and reciprocates the first reciprocating plate 73 in regard of the second direction D2 and the height direction D3 (see FIGS. 24 to 28).

Attendant on such reciprocation of the first reciprocating plate 73, the first relay pusher 33a and the second relay pusher 33b which are attached to the first reciprocating plate 73 and the first pusher 31 which is connected to the first reciprocating plate 73 through the pushing-in lever 75 are reciprocated in regard of the second direction D2 and the height direction D3.

To each first reciprocating plate 73, an intermediate portion of the pushing-in lever 75 is oscillatably connected. An end portion of the first pusher 31 is fixed to a one-side end portion of the pushing-in lever 75, a cylinder of the air cylinder 74 is oscillatably fixed to an other-side end portion of the pushing-in lever 75. The cylinder constitutes a one-side end portion of the air cylinder 74, and an other-side end portion of the air cylinder 74 is oscillatably fixed to the first reciprocating plate 73. The projection amount of the cylinder of the air cylinder 74 is variable, and, according to the projection amount of the cylinder, the posture of the pushing-in lever 75 relative to the first reciprocating plate 73 is determined, and the position (particularly, the position in the height direction D3) of the first pusher 31 is varied. Therefore, the projection amount of the cylinder of the air cylinder 74 is determined according to the size (particularly, the size in the height direction D3) of the objects 1 to be conveyed, and the first pusher 31 contacts and pushes the objects 1 at an appropriate position.

Note that the aforementioned first driving section and air cylinder 74 are controlled by a controller (not shown).

Figure 24:
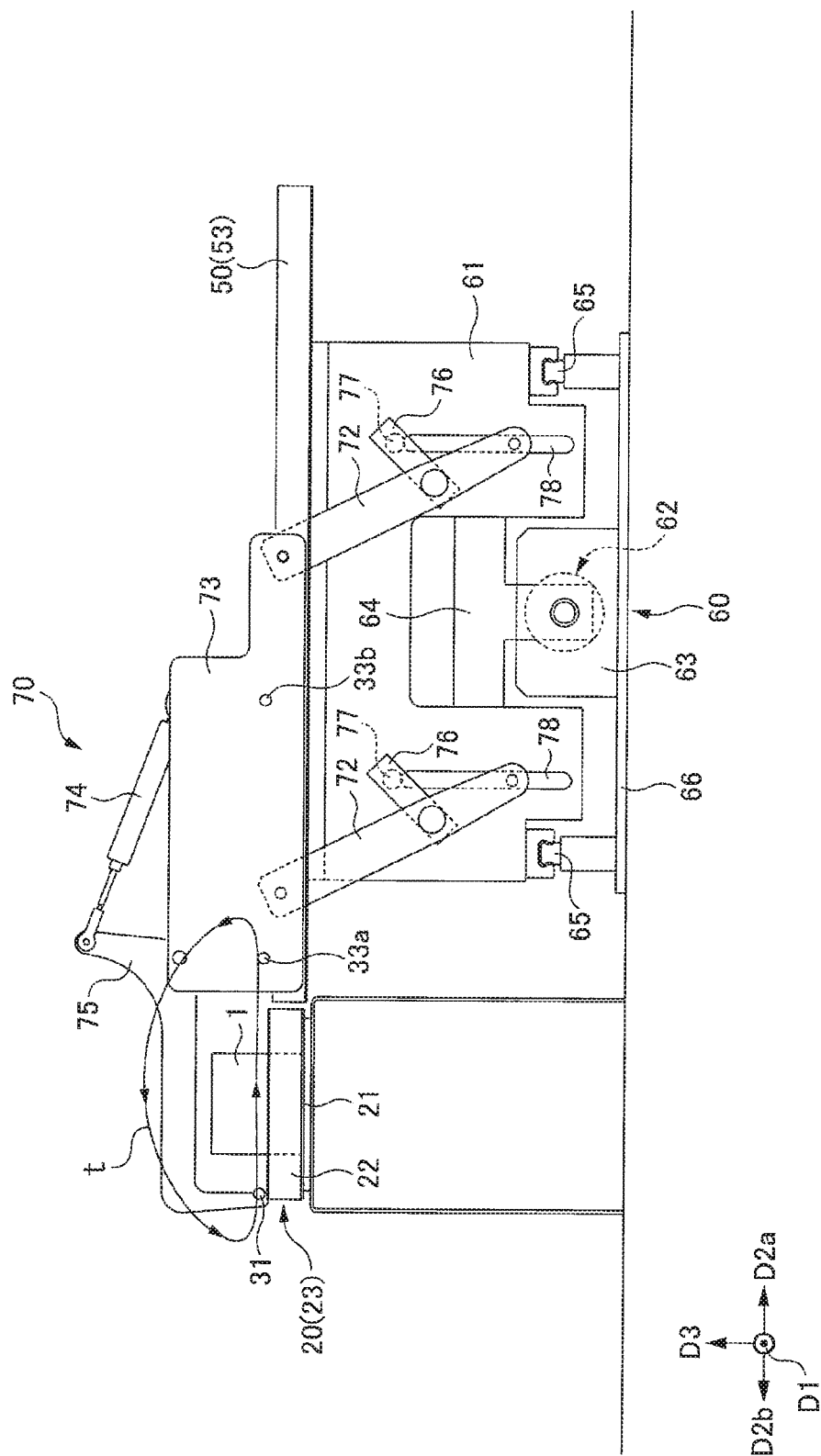
FIG. 24 is a side view showing general configuration of a relay driving section and a first pusher driver, illustrating change in the state of the first pusher driver over time.
Figure 25:
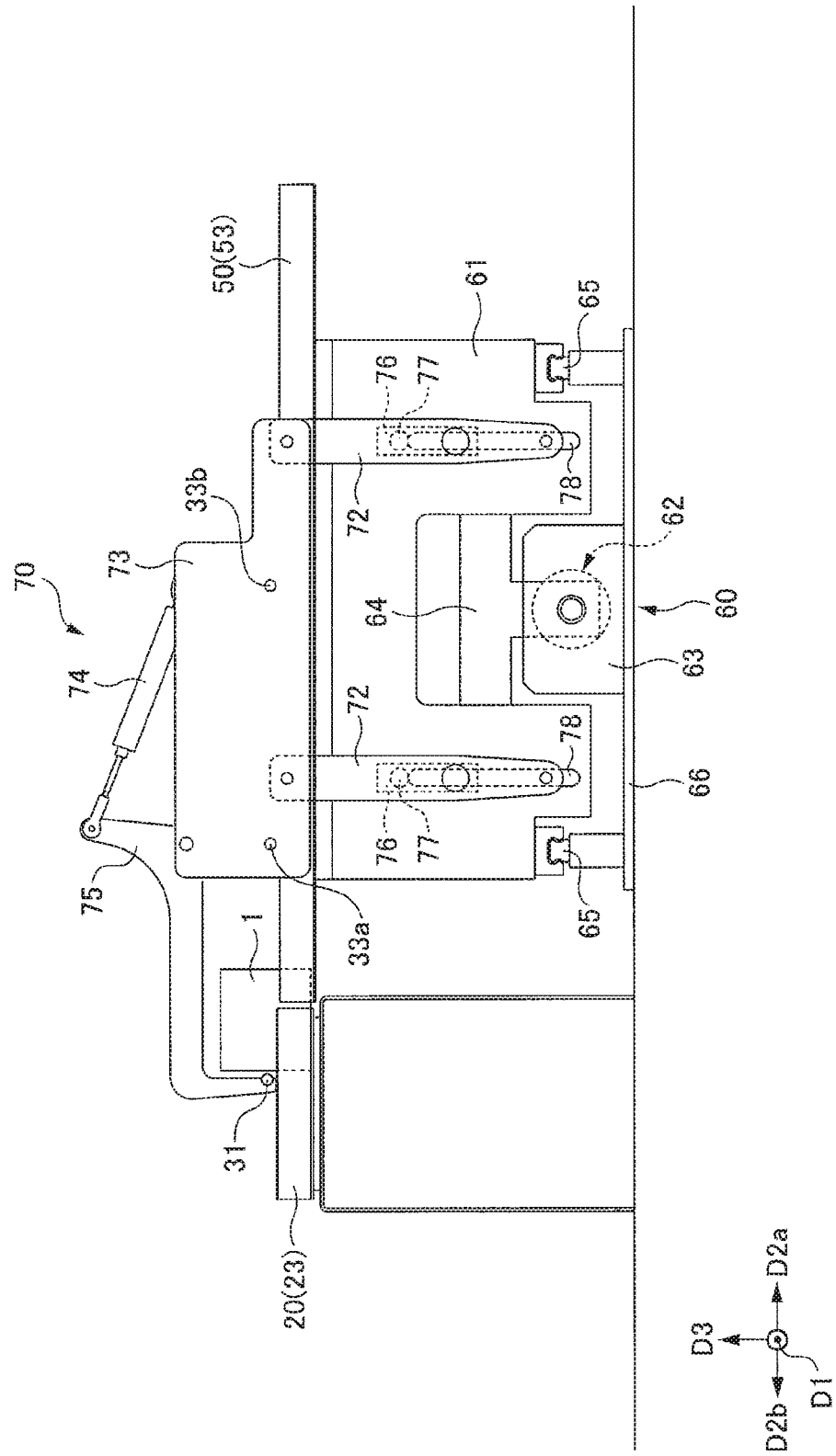
FIG. 25 is a side view showing general configurations of the relay driving section and the first pusher driver, illustrating change in the state of the first pusher driver over time.
Figure 26:
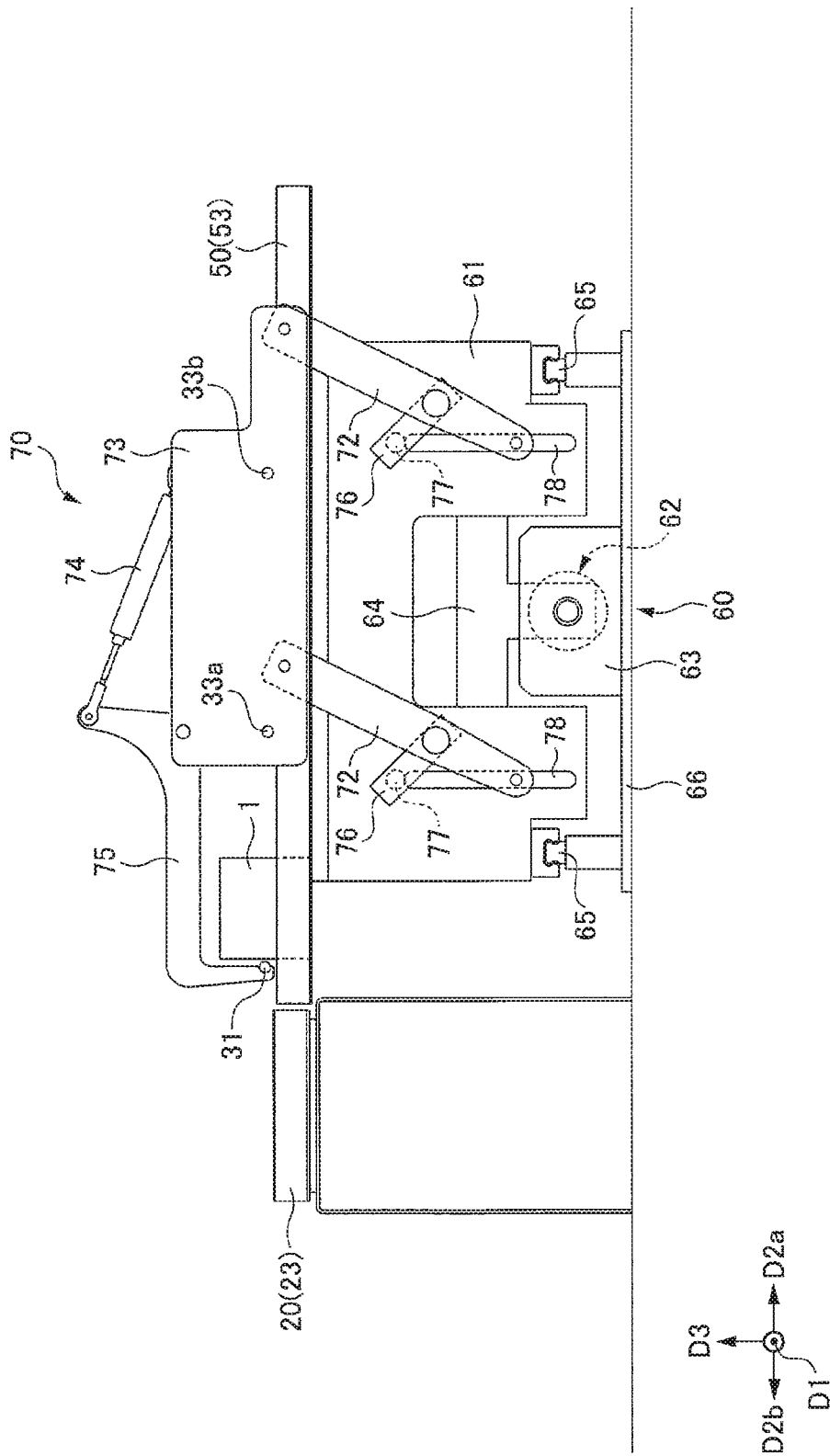
FIG. 26 is a side view showing general configurations of the relay driving section and the first pusher driver, illustrating change in the state of the first pusher driver over time.
Figure 27:
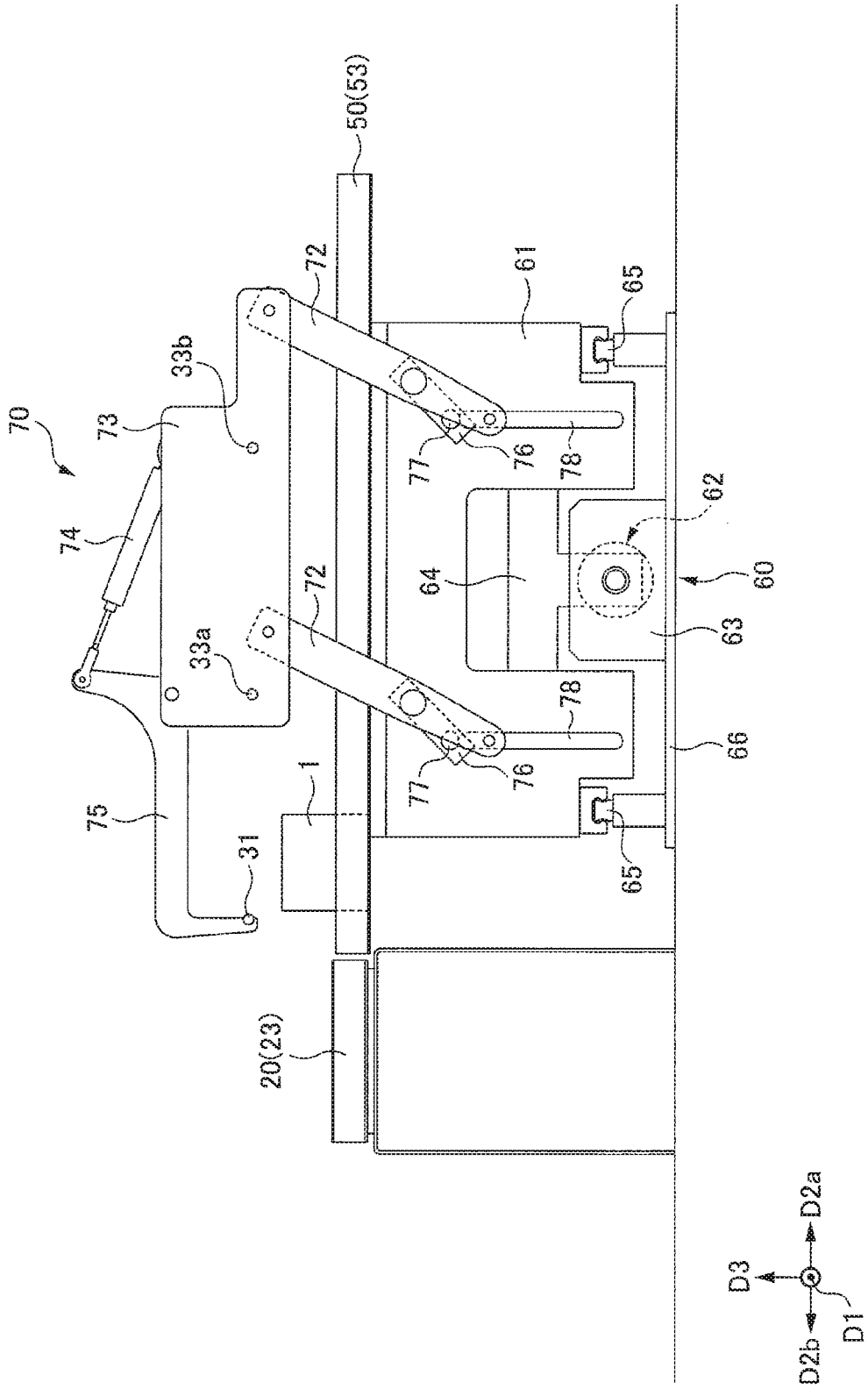
FIG. 27 is a side view showing general configurations of the relay driving section and the first pusher driver, illustrating change in the state of the first pusher driver over time.
Figure 28:
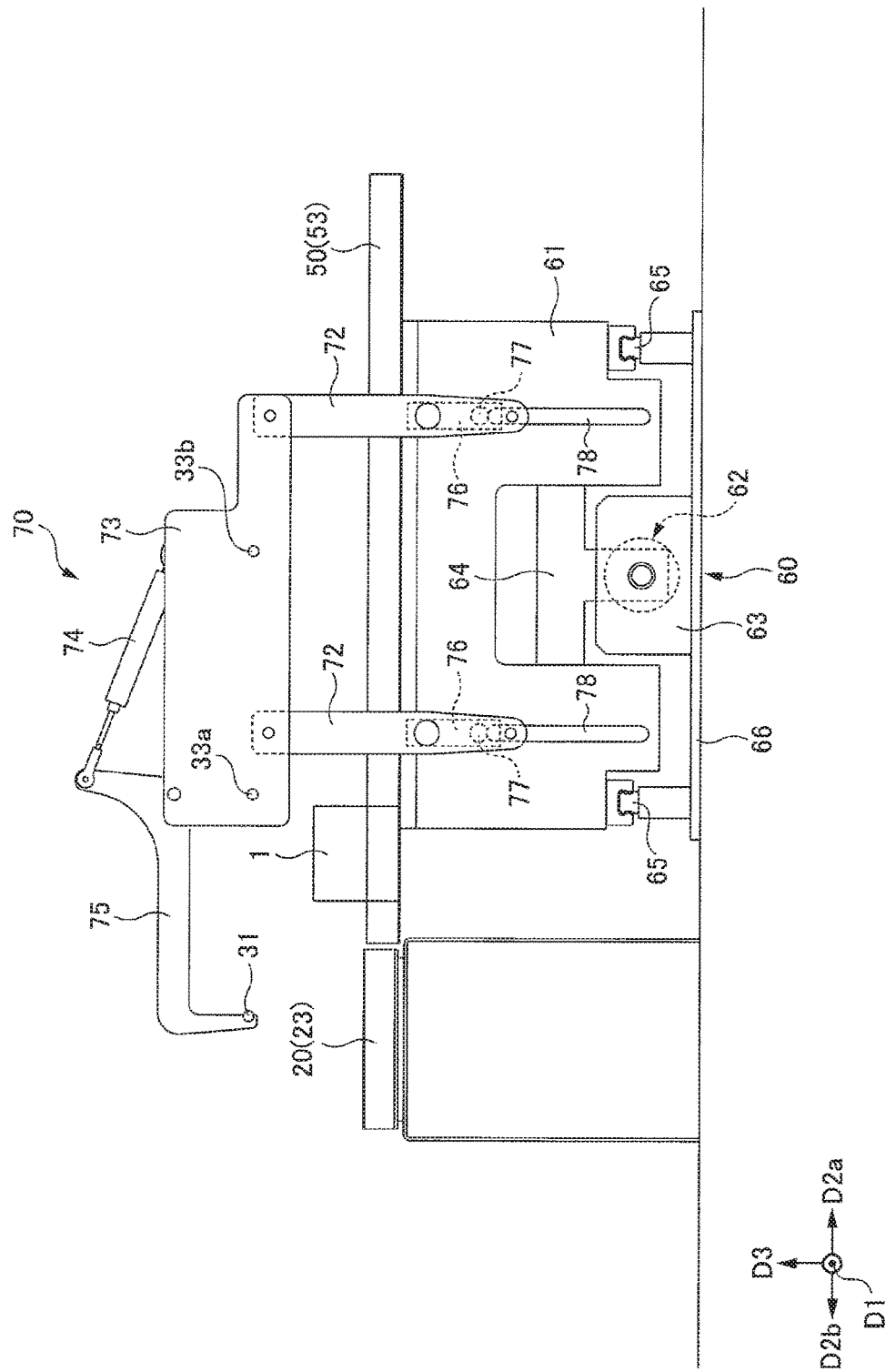
FIG. 28 is a side view showing general configurations of the relay driving section and the first pusher driver, illustrating change in the state of the first pusher driver over time.

By the first pusher driver 70 having the aforementioned configuration, the first pusher 31 is moved along a closed-loop trajectory indicated by symbol "t" in FIG. 24. Specifically, the first pusher 31 repeatedly performs a first moving process of moving substantially horizontally in the second forward direction D2a from a retracted position (a leftmost end position of the closed-loop trajectory t shown in FIG. 24), a second moving process of rising in regard of the height direction D3 while moving in the second reverse direction D2b, and a third moving process of being lowered in regard of the height direction D3 while moving in the second reverse direction D2b. In the first moving process, the objects 1 to be conveyed are pushed out from the accommodating spaces 23 of the first conveying section 20 onto the relay conveying section 50 (particularly, the introducing passages 51) by the first pusher 31. In the second moving process, the first pusher 31 returns in the second reverse direction D2b from the position where the pushing-out of the objects 1 is completed, so as not to contact the other objects 1 on the first conveying section 20. In the third moving process, the first pusher 31 is returned into a position which is on the upstream side (namely, on the second reverse direction D2b side) of the objects 1 on the first conveying section 20 and at which the first pusher 31 can contact the objects 1 on the first conveying section 20 in regard of the height direction D3 (namely, into the retracted position). The first to third moving processes are repeated continuously, whereby the first pusher 31 can continuously transfer the objects 1 from the accommodating spaces 23 of the first conveying section 20 onto the introducing passages 51 of the relay conveying section 50.

In addition, though not illustrated, the trajectories of the first relay pusher 33a and the second relay pusher 33b moved by the first pusher driver 70 are similar in shape to the aforementioned trajectory of the first pusher 31 (see symbol "t" in FIG. 24). Specifically, each of the first relay pusher 33a and the second relay pusher 33b repeatedly performs at similar timings a first moving process of moving substantially horizontally in the second forward direction D2a from a retracted position (namely, a most upstream side position in regard of the second forward direction D2a), a second moving process of rising in regard of the height direction D3 while moving in the second reverse direction D2b, and a third moving process of being lowered in regard of the height direction D3 while moving in the second reverse direction D2b. The first to third moving processes are repeated continuously, whereby the first relay pusher 33a and the second relay pusher 33b can continuously transfer the objects 1 from the introducing passages 51 to the junction passage 52, of each relay conveying passage 53.

<Second Pusher Driver>

As illustrated in FIG. 12, the second pusher driver 85 for moving the second pusher 32 in the second direction D2 and the height direction D3 includes a second drive source (not shown) accommodated in a second driving box 86, second connection members 87 and second reciprocating plates 88, and constitutes a link mechanism similar to that of the first pusher driver 70.

To each second reciprocating plate 88 are connected two sets of second driving mechanisms. Each second driving mechanism includes a second driving section (omitted from illustration) controlled by the controller (not shown), a rotating block (omitted from illustration) fixed to a rotary shaft of the second driving section, and the second connection members 87 oscillatably connected to the rotating block.

To each second reciprocating plate 88, one-side end portions of the two second connection members 87 are oscillatably connected at positions spaced from each other in the second direction D2. The two sets of second driving mechanisms connected to each second reciprocating plate 88 operate in conjunction with each other, and the second connection members 87 included in the second driving mechanisms are so driven as to constantly assume postures which are the same with each other. By this configuration, each second reciprocating plate 88 is reciprocated in the second direction D2 and the height direction D3, and, during reciprocation of the second reciprocating plate 88, the second reciprocating plate 88 performs a translation motion in a plane defined by the second direction D2 and the height direction D3.

In each second driving mechanism, a rotary shaft of the second driving section is fixed to one end side of the rotating block, and the second connection member 87 is oscillatably connected to the other end side of the rotating block. One end portion of each second connection member 87 is oscillatably connected to the second reciprocating plate 88, and the other end portion is slidably engaged with a guide groove formed in the moving body. The other end portion of each second connection member 87 is guided in the height direction D3 along the guide groove. Each second connection member 87 is connected to the rotating block, between the part of connection to the second reciprocating plate 88 and the part of engagement with the guide groove, assumes a posture according to the rotational position of the rotary shaft of the second driving section, and reciprocates the second reciprocating plate 88 in regard of the second direction D2 and the height direction D3.

Attendant on such reciprocation of the second reciprocating plate 88, the second pusher 32 attached to one end portion of the second reciprocating plate 88 is reciprocated in regard of the second direction D2 and the height direction D3. Though not illustrated, the trajectory of the second pusher 32 moved by the second pusher driver 85 is similar in shape to the aforementioned trajectory of the first pusher 31 (see symbol "t" in FIG. 24). Specifically, the second pusher 32 repeatedly performs a first moving process of moving substantially horizontally in the second forward direction D2a from a retracted position (a most upstream side position in regard of the second forward direction D2a), a second moving process of rising in regard of the height direction D3 while moving in the second reverse direction D2b, and a third moving process of being lowered in regard of the height direction D3 while moving in the second reverse direction D2b.

<Relay Driving Section>

As illustrated in FIG. 24, the relay driving section 60 for moving the relay conveying section 50 in the first forward direction D1a and the first reverse direction D1b includes a moving body 61, a servo motor 62, a servo motor mounting plate 63, a connection block 64 and first direction guide rails 65.

Specifically, the relay driving section 60 includes the aforementioned moving body 61 that supports the relay conveying section 50 in a fixed manner, and the connection block 64 is fixedly attached to the moving body 61. The connection block 64 is in screw engagement with a rotary shaft of the servo motor 62, and is moved along the rotary shaft according to rotation of the rotary shaft.

The rotary shaft of the servo motor 62 extends in the first direction D1, and the servo motor 62 is mounted to a frame 66 through the servo motor mounting plate 63. Two first direction guide rails 65 extending in the first direction D1 are provided on the frame 66, and the moving body 61 is slidably engaged with the first direction guide rails 65. The connection block 64 is moved along the rotary shaft of the servo motor 62, and the moving body 61 is moved along the first direction guide rails 65.

Rotation of the rotary shaft of the servo motor 62 is controlled under the control of the controller (not shown), whereby the positions of the connection block 64 and the moving body 61 in regard of the first direction D1 are adjusted. By this, the relay conveying section 50 provided fixedly relative to the moving body 61, the first pusher 31 and the relay pushers 33 (namely, the first relay pusher 33*a* and the second relay pusher 33*b*) can be reciprocated as one body in the first direction D1.

[Transfer Flow of Objects to be Conveyed]

Conveyance flow of the objects 1 to be conveyed, in the relay device 10 in this embodiment, will be described below. A case where conveyance of the objects 1 to be conveyed is started from a state in which the conveyance of the objects 1 is not conducted in the relay device 10 will be described below.

Note that in the conveyance flow of the objects 1 described below, devices constituting the relay device 10 are integratedly controlled by the controller (not shown). For example, a drive source for the conveyor belt 21, a drive source for the conveyor belt 27, the first driving section, the second driving section, the air cylinder 74 and the servo motor 62 are controlled by the controller (not shown), and the devices constituting the relay device 10 are driven.

<Continuous Conveying Step of First Conveying Section>

As shown in FIGS. 1, 13, 14 and 24, the conveyor belt 21 travels in the first forward direction D1*a* in a state in which the object 1 to be conveyed is disposed in each accommodating space 23, whereby the objects 1 are continuously conveyed. The continuous conveyance of the objects 1 conducted by the first conveying section 20 is performed continuously while each of the following steps is carried out.

<Transferring Step from First Conveying Section to Relay Conveying Section>

Besides, as shown in FIGS. 2, 3, 15, 25 and 26, the objects 1 are pushed and moved from the accommodating spaces 23 of the first conveying section 20 to the introducing passages 51 of the relay conveying section 50, by the first pusher 31.

Figure 2:
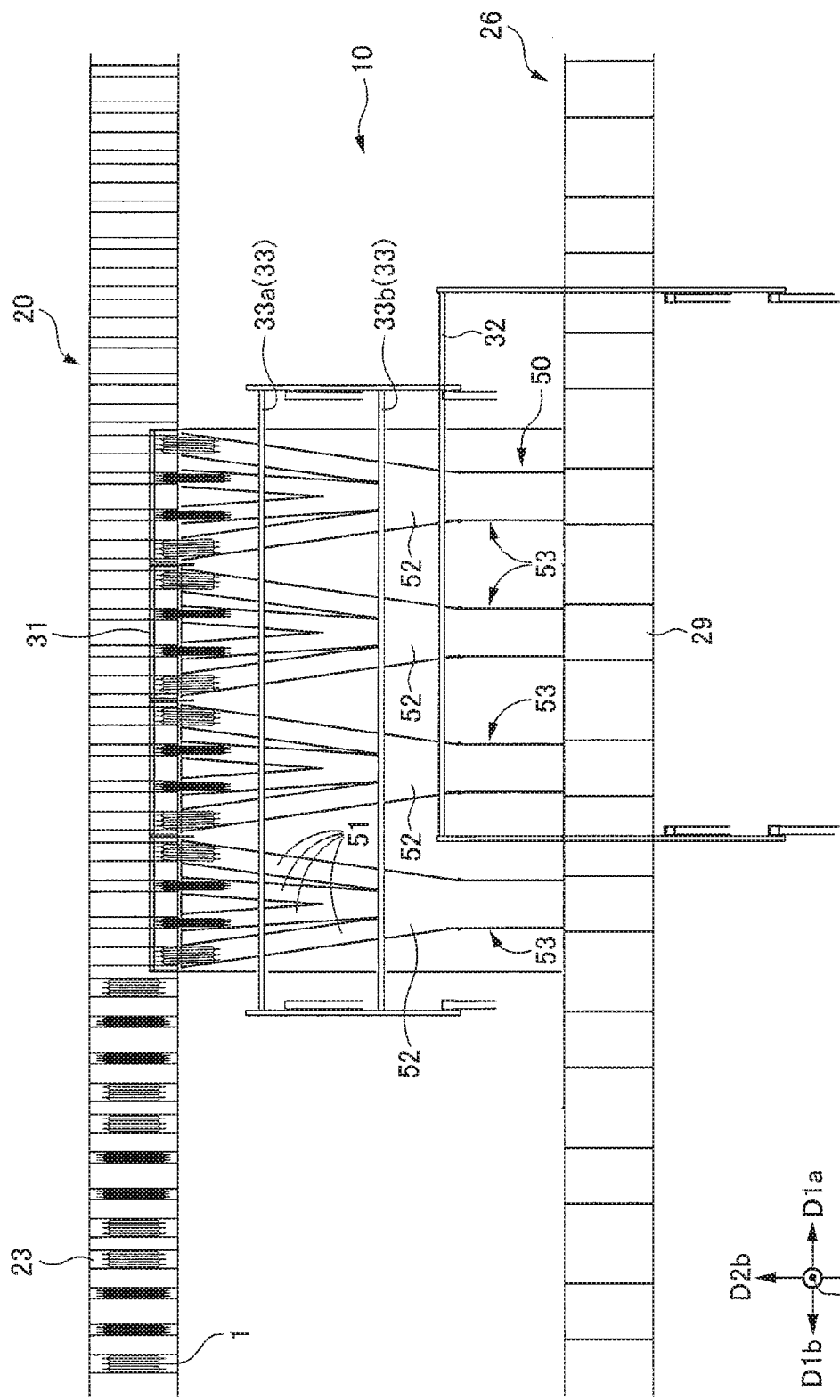
FIG. 2 is a plan view showing general configuration of the relay device according to one embodiment of the present invention, illustrating change in the state of the relay device over time.
Figure 3:
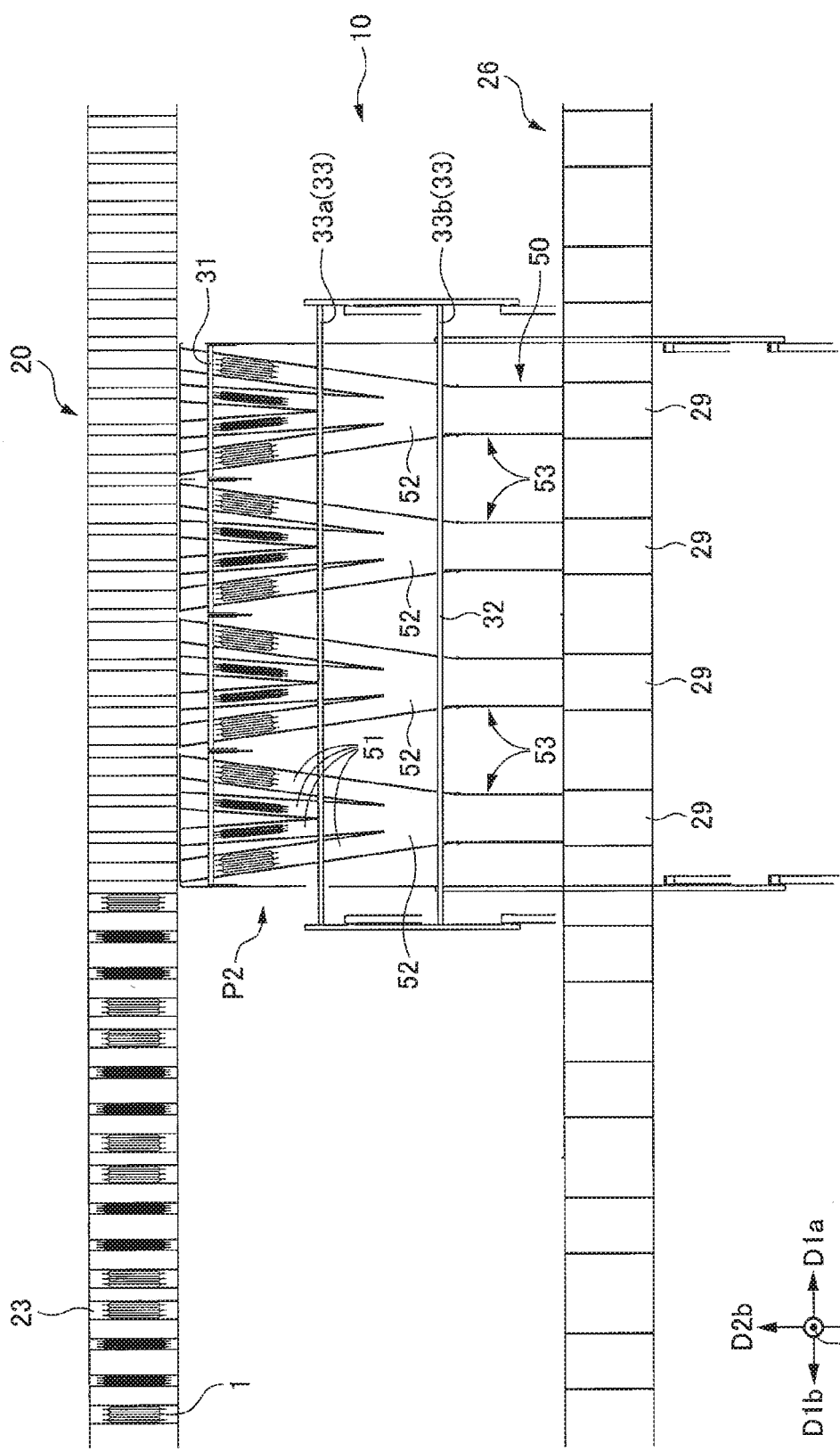
FIG. 3 is a plan view showing general configuration of the relay device according to one embodiment of the present invention, illustrating change in the state of the relay device over time.

In this instance, as shown in FIGS. 2 and 3, the relay conveying section 50, the first pusher 31 and the relay pushers 33 (namely, the first relay pusher 33*a* and the second relay pusher 33*b*) are moved in the first forward direction D1*a* in such a manner that the introducing passages 51 of the relay conveying section 50 follow up, at the same speed, to the accommodating spaces 23 of the first conveying section 20. By this, the relay conveying section 50 is moved from the first synchronous conveying position P1 (see FIG. 1) to the second synchronous conveying position P2 (see FIG. 3). Note that while the relay conveying section 50 is moved from the first synchronous conveying position P1 to the second synchronous conveying position P2 (in other words, at the timing of the arrival of the relay conveying section 50 at the second synchronous conveying position P2 or before the timing), the movement of the objects 1 from the accommodating spaces 23 to the introducing passages 51 conducted by the first pusher 31 is completed.

<Returning Step>

Figure 4:
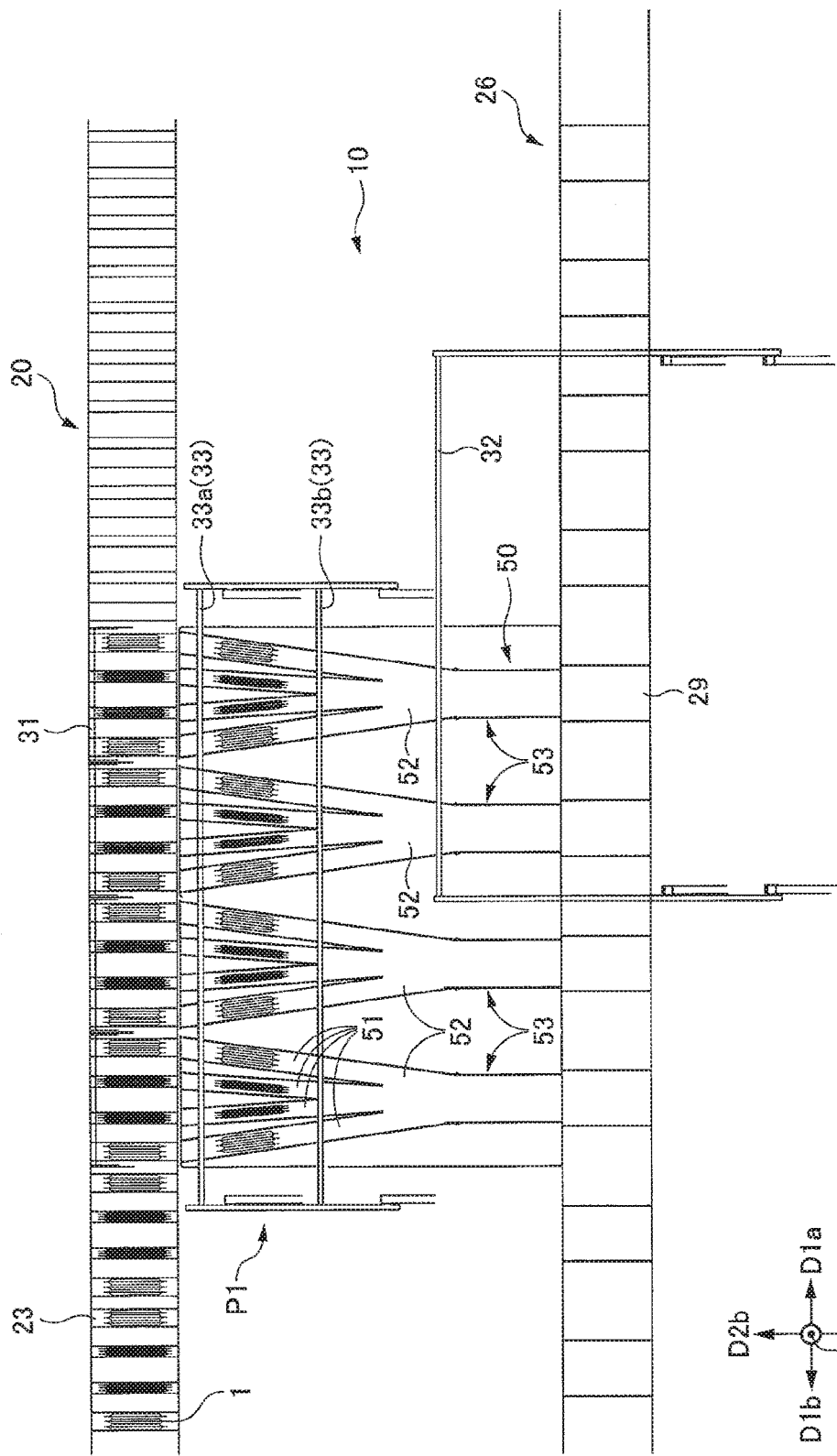
FIG. 4 is a plan view showing general configuration of the relay device according to one embodiment of the present invention, illustrating change in the state of the relay device over time.

Then, as shown in FIG. 4, the relay conveying section 50, the first pusher 31 and the relay pushers 33 (namely, the first relay pusher 33*a* and the second relay pusher 33*b*) are moved in the first reverse direction D1*b*, and returned from the second synchronous conveying position P2 to the first synchronous conveying position P1.

In addition, as shown in FIGS. 4, 16, 17, 27 and 28, the first pusher 31 and the relay pushers 33 (namely, the first relay pusher 33*a* and the second relay pusher 33*b*) are disposed on the upstream side (namely, the second reverse direction D2*b* side) of the corresponding objects 1 to be conveyed. Specifically, the first pusher 31 is disposed on the upstream side of the objects 1 disposed in the accommodating spaces 23 of the first conveying section 20, and the first relay pusher 33*a* is disposed on the upstream side of the objects 1 disposed in the introducing passages 51. Note that the second relay pusher 33*b* is disposed on the upstream side of the aforementioned intermediate junction passage of each relay conveying section 53.

In this instance, the first pusher 31 is moved in the second reverse direction D2*b* by passing over the objects 1 disposed in the accommodating spaces 23 of the first conveying section 20, and the first relay pusher 33*a* is moved in the second reverse direction D2*b* by passing over the objects 1 disposed on the introducing passage 51. By this, the first pusher 31 and the first relay pusher 33*a* are prevented from making contact with the objects 1 to be conveyed.

<First Merging Step>

Figure 5:
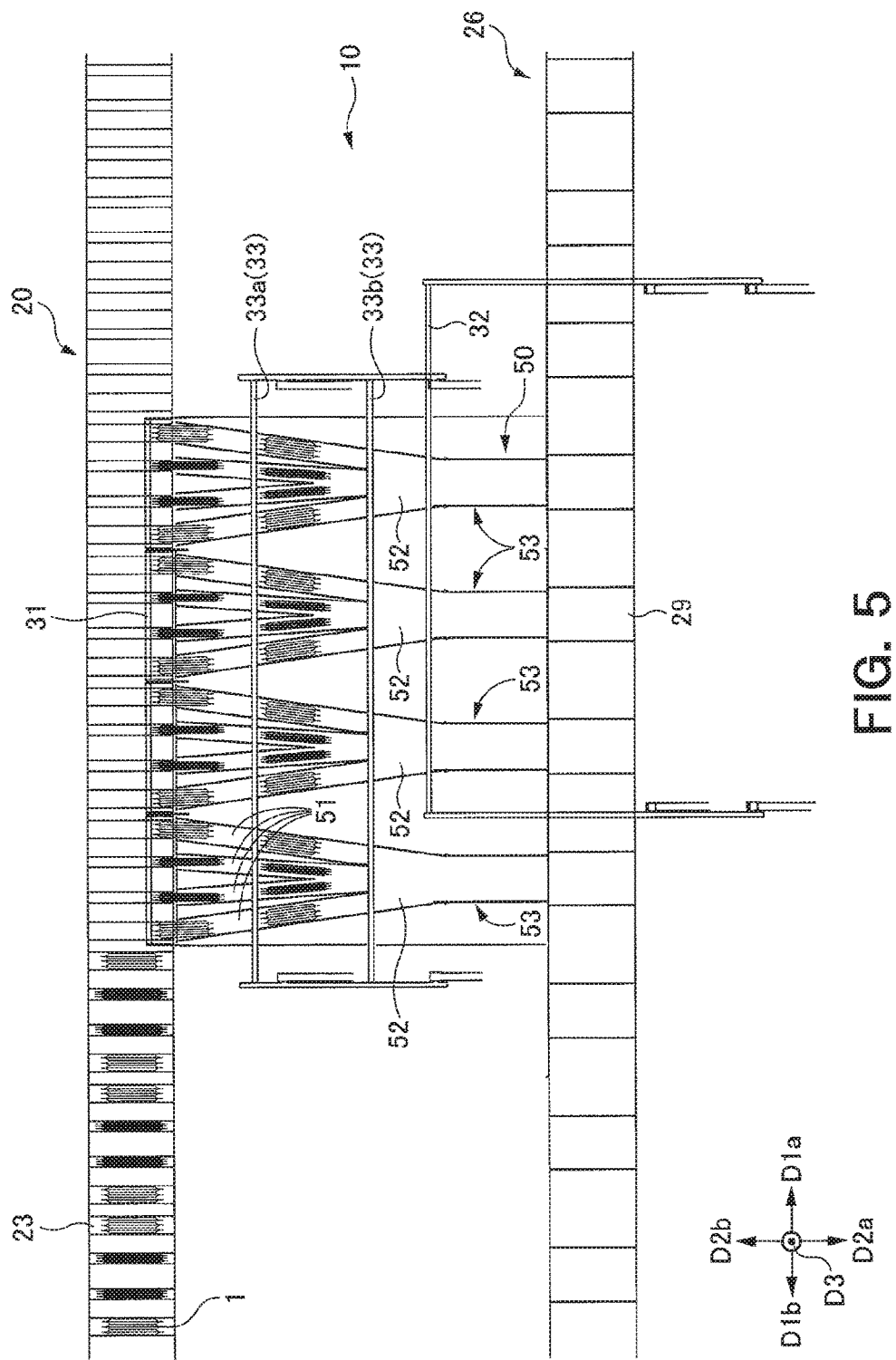
FIG. 5 is a plan view showing general configuration of the relay device according to one embodiment of the present invention, illustrating change in the state of the relay device over time.
Figure 6:
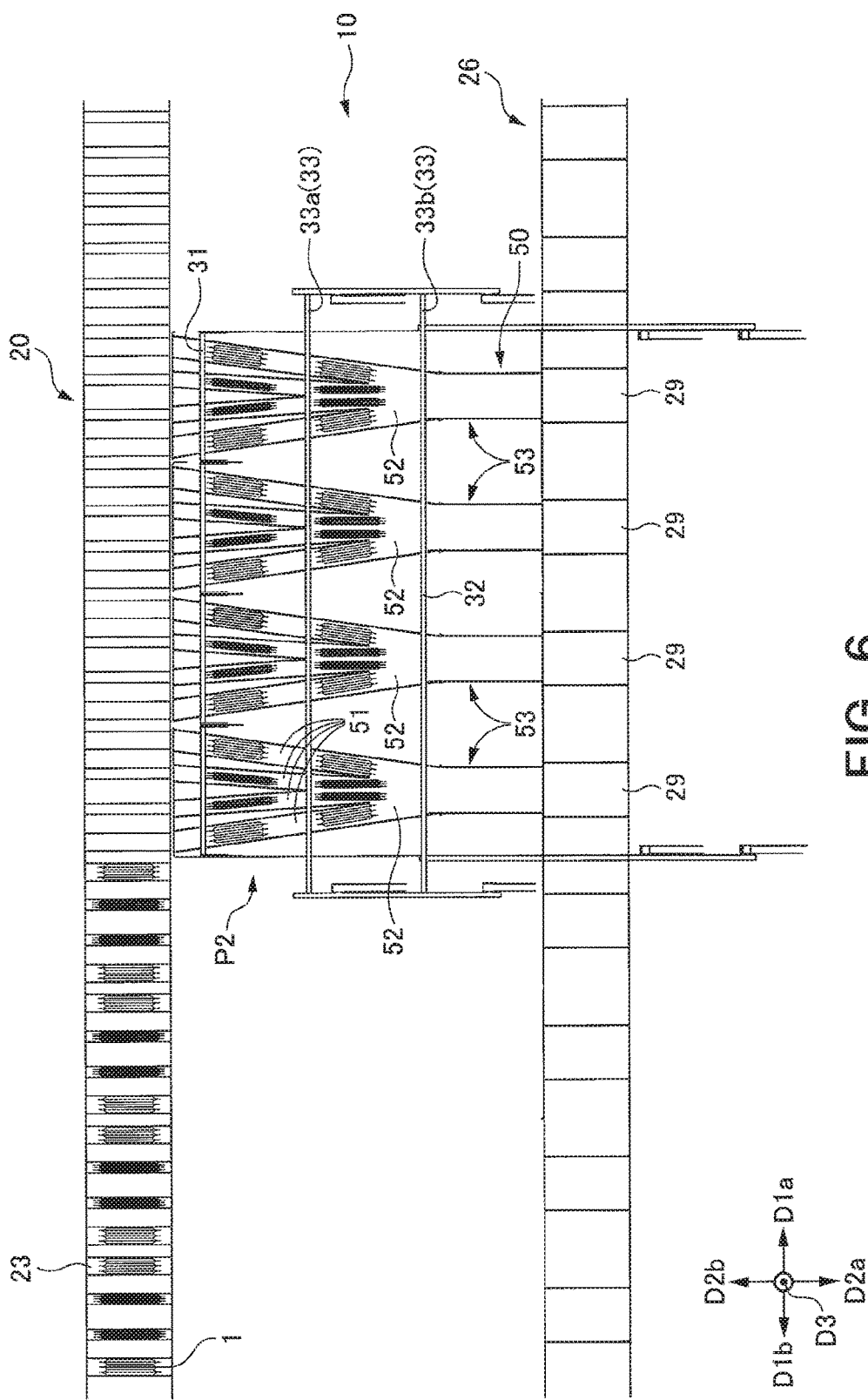
FIG. 6 is a plan view showing general configuration of the relay device according to one embodiment of the present invention, illustrating change in the state of the relay device over time.
Figure 18:
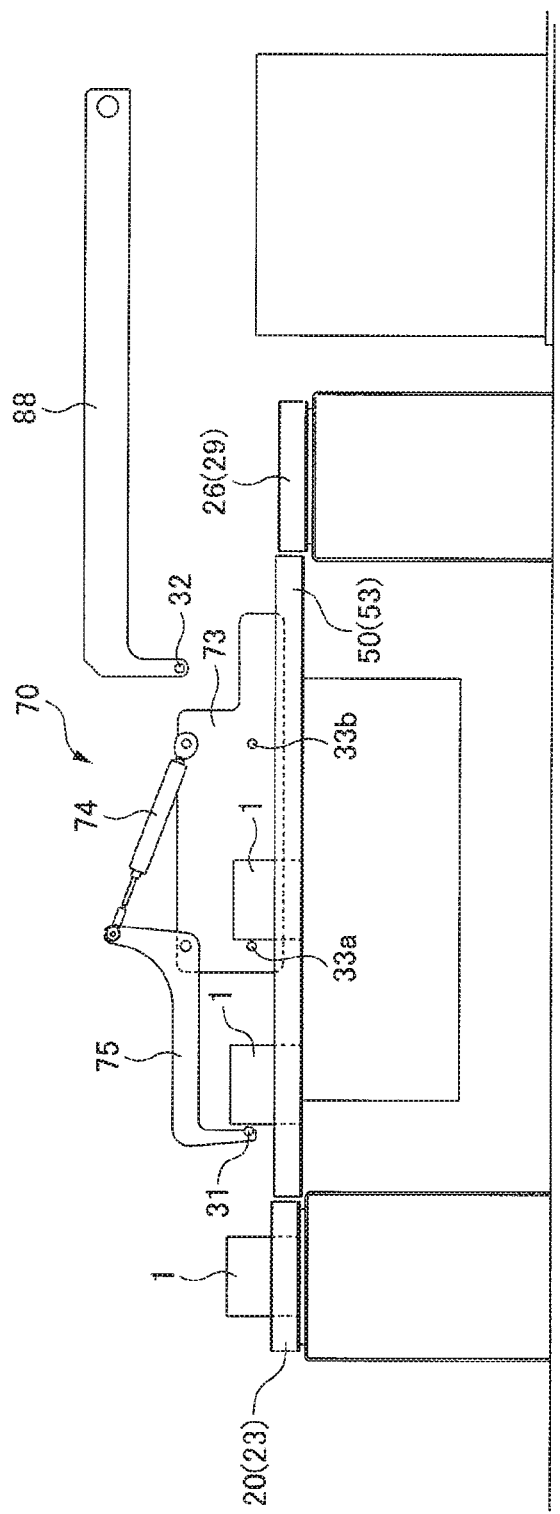
FIG. 18 is a side view showing general configuration of the pusher driving system of the relay device, illustrating change in the state of the pusher driving system over time.

Then, as shown in FIGS. 5, 6 and 18, by the first pusher 31 which is moved in the second forward direction D2*a*, new objects 1 to be conveyed are moved from the accommodating spaces 23 of the first conveying section 20 to the introducing passages 51 of the relay conveying section 50. In addition, by the first relay pusher 33*a* which is moved in the second forward direction D2*a*, the objects 1 to be conveyed are moved toward the downstream side from the introducing passages 51 of the relay conveying section 50, and the objects 1 disposed on the two introducing passages 51 located in the center of each relay conveying passage 53 merge on the intermediate junction passage.

In this instance, as shown in FIGS. 5 and 6, the relay conveying section 50, the first pusher 31 and the relay pushers 33 are moved in the first forward direction D1*a*, in such a manner that the introducing passages 51 of the relay conveying section 50 follow up, at the same speed, to the accommodating spaces 23 of the first conveying section 20. In addition, the movement of the objects 1 in the second forward direction D2*a* conducted by the first pusher 31 and the first relay pusher 33*a* is completed while the relay conveying section 50 is moved from the first synchronous conveying position P1 (see FIG. 4) to the second synchronous conveying position P2 (see FIG. 6) (in other words, at the timing of the arrival of the relay conveying section 50 at the second synchronous conveying position P2 or before the timing).

<Returning Step>

Figure 7:
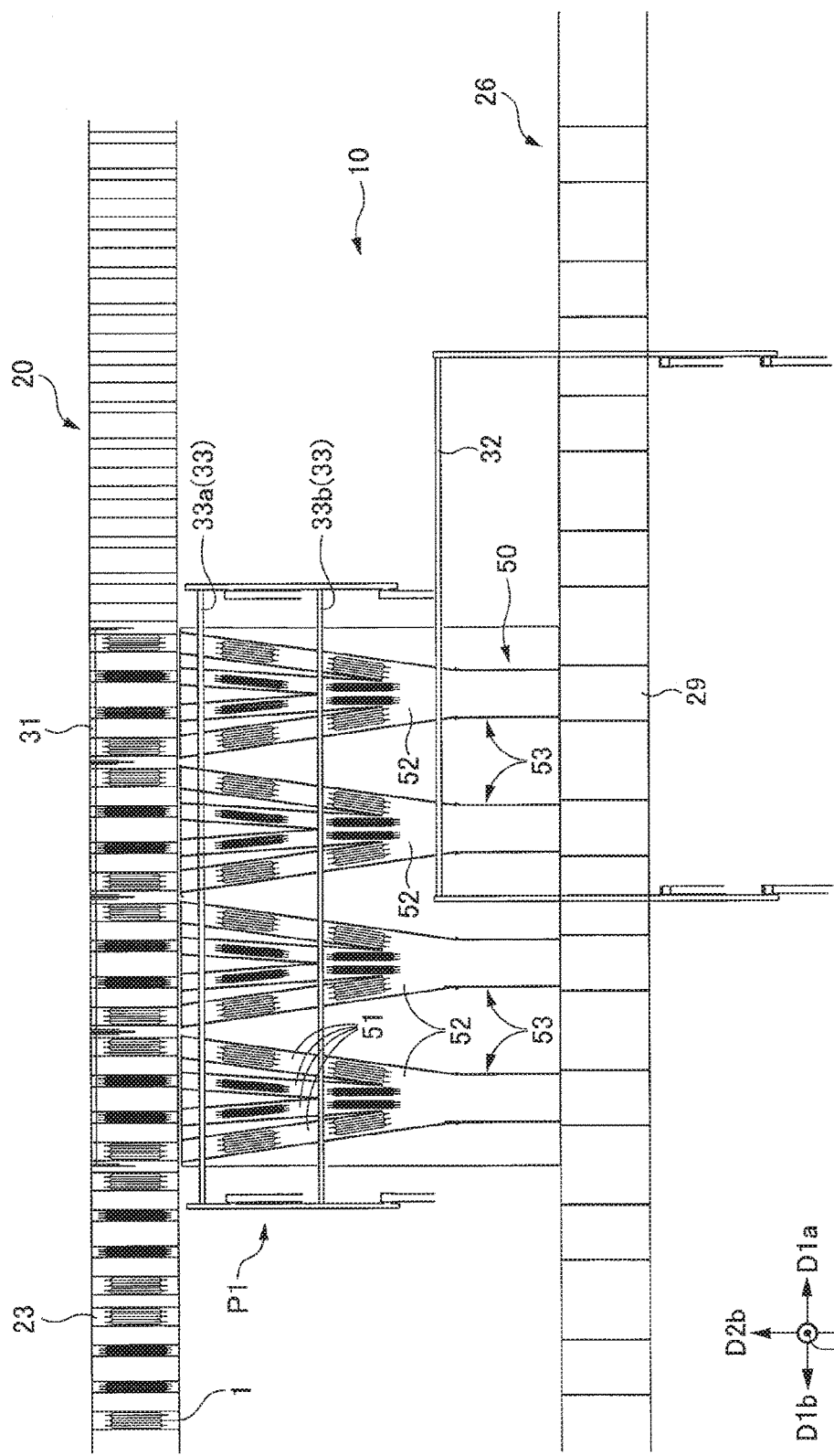
FIG. 7 is a plan view showing general configuration of the relay device according to one embodiment of the present invention, illustrating change in the state of the relay device over time.
Figure 19:
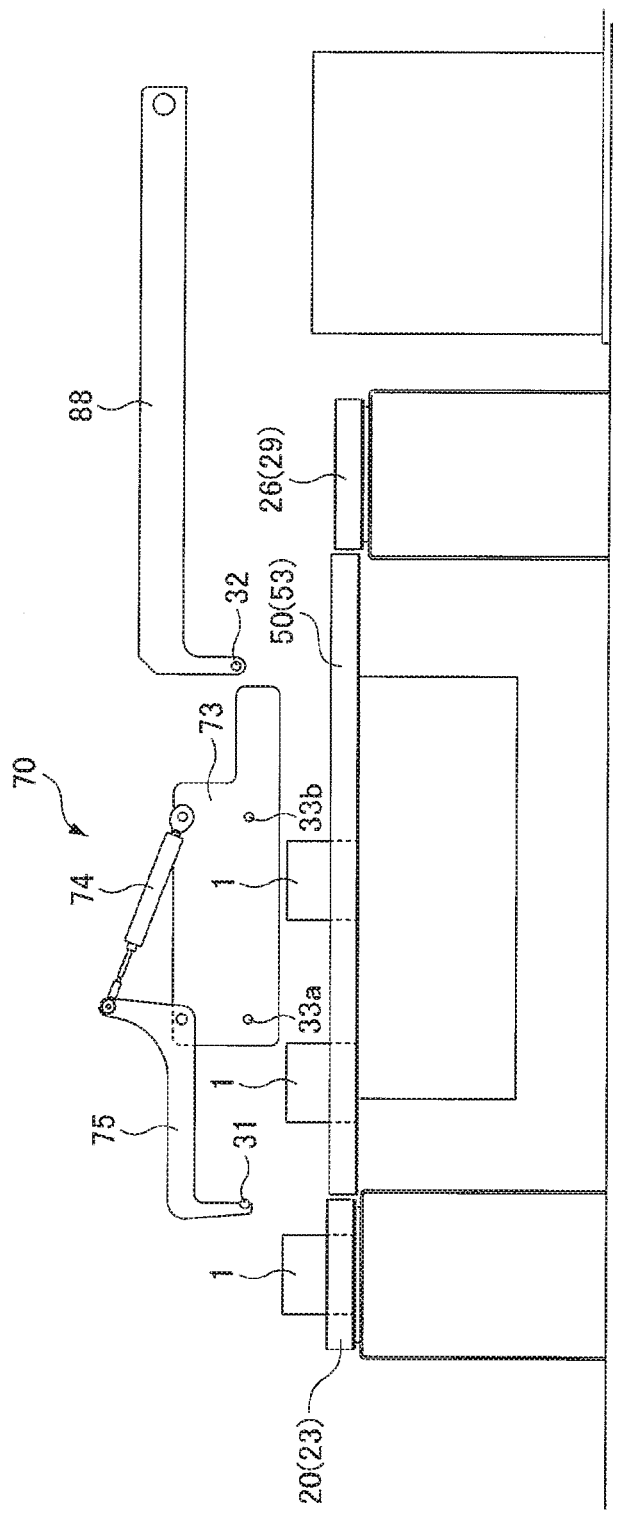
FIG. 19 is a side view showing general configuration of the pusher driving system of the relay device, illustrating change in the state of the pusher driving system over time.

Then, as shown in FIG. 7, the relay conveying section 50, the first pusher 31 and the relay pushers 33 are moved in the first reverse direction D1*b*, and returned from the second synchronous conveying position P2 to the first synchronous conveying position P1. In addition, as shown in FIGS. 7, 19 and 20, the first pusher 31 and the relay pushers 33 are disposed on the upstream side of the corresponding objects 1 to be conveyed.

<Second Merging Step>

Figure 8:
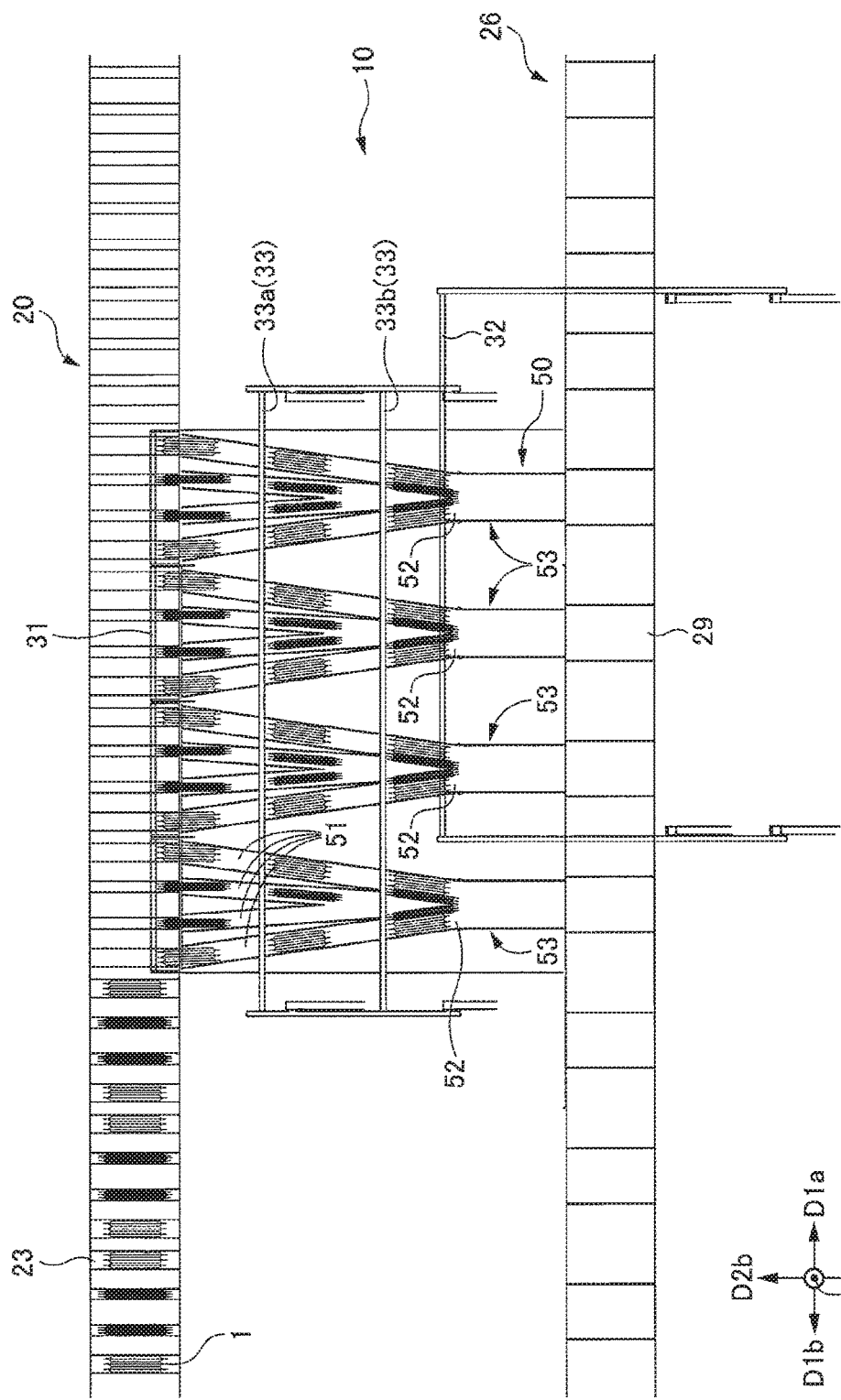
FIG. 8 is a plan view showing general configuration of the relay device according to one embodiment of the present invention, illustrating change in the state of the relay device over time.
Figure 9:
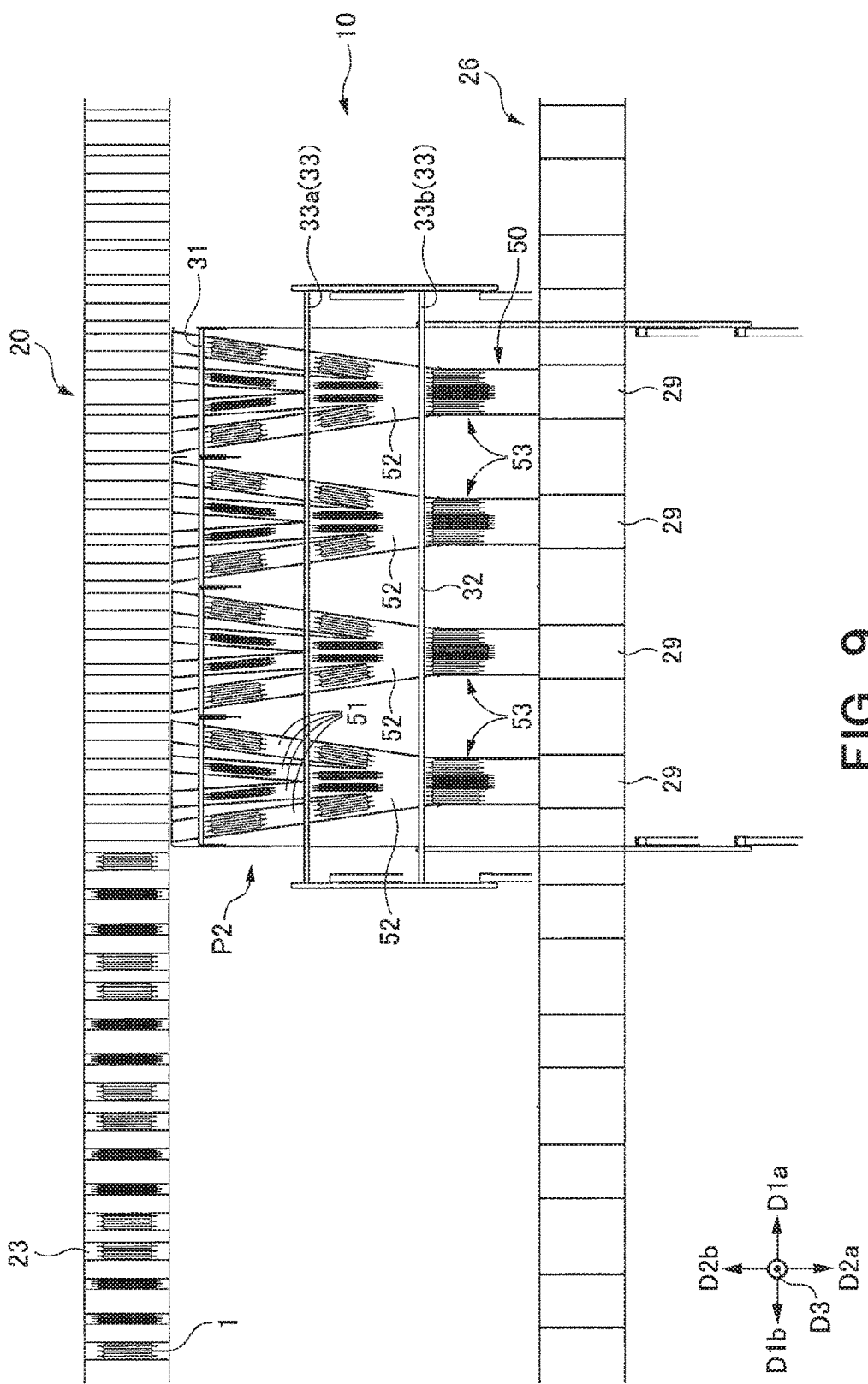
FIG. 9 is a plan view showing general configuration of the relay device according to one embodiment of the present invention, illustrating change in the state of the relay device over time.
Figure 21:
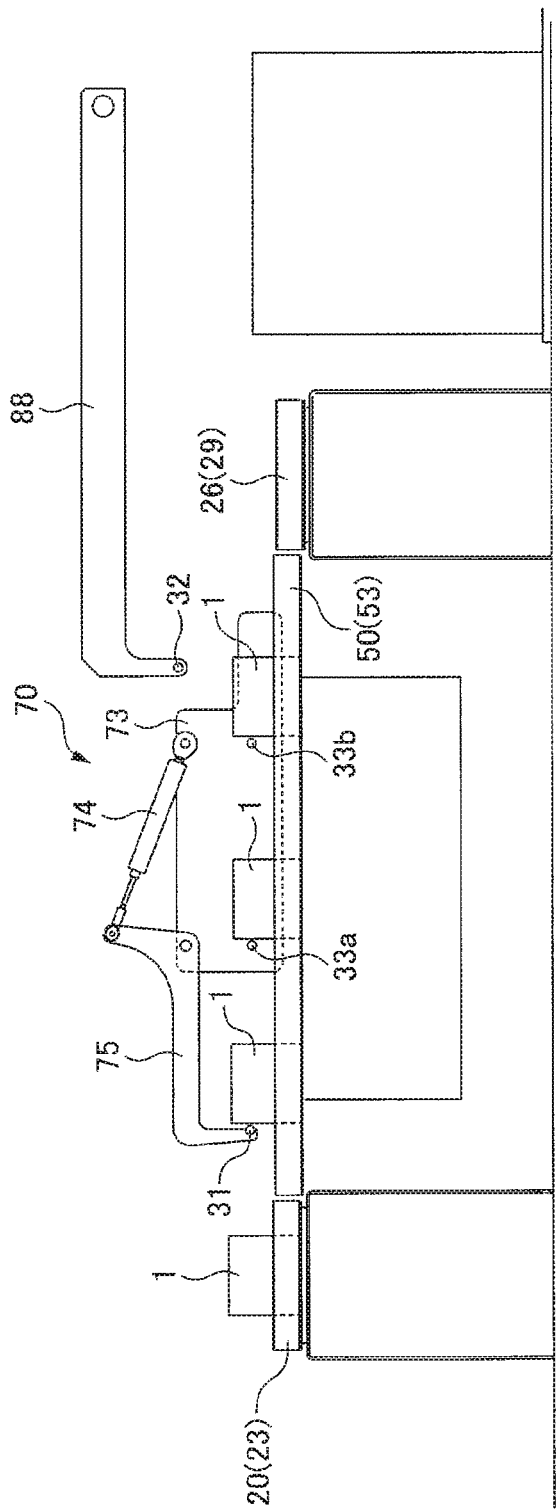
FIG. 21 is a side view showing general configuration of the pusher driving system of the relay device, illustrating change in the state of the pusher driving system over time.

Then, as illustrated in FIGS. 8, 9 and 21, the objects 1 to be conveyed are moved from the accommodating spaces 23 of the first conveying section 20 to the introducing passages 51 of the relay conveying section 50 by the first pusher 31. In addition, the objects 1 are moved toward the downstream side from the introducing passages 51 of the relay conveying section 50 by the first relay pusher 33*a*, and the objects 1 disposed on the two introducing passages 51 located in the center of each relay conveying section 53 merge on the intermediate junction passage. Besides, the objects 1 disposed on the intermediate junction passage of each relay conveying section 53 and the objects 1 disposed on the introducing passages 51 located at both ends are moved toward the downstream side by the second relay pusher 33b, and these objects 1 merge in the junction passage 52.

In this instance, as shown in FIGS. 8 and 9, the relay conveying section 50, the first pusher 31 and the relay pusher 33 are moved in the first forward direction D1a in such a manner that the introducing passages 51 of the relay conveying section 50 follow up, at the same speed, to the accommodating spaces 23 of the first conveying section 20. In addition, the movement of the objects 1 in the second forward direction D2a conducted by the first pusher 31, the first relay pusher 33a and the second relay pusher 33b is completed while the relay conveying section 50 is moved from the first synchronous conveying position P1 (see FIG. 7) to the second synchronous conveying position P2 (see FIG. 9) (in other words, at the timing of the arrival of the relay conveying section 50 at the second synchronous conveying position P2 or before the timing).

<Transferring Step from Relay Conveying Section to Second Conveying Section>

Figure 22:
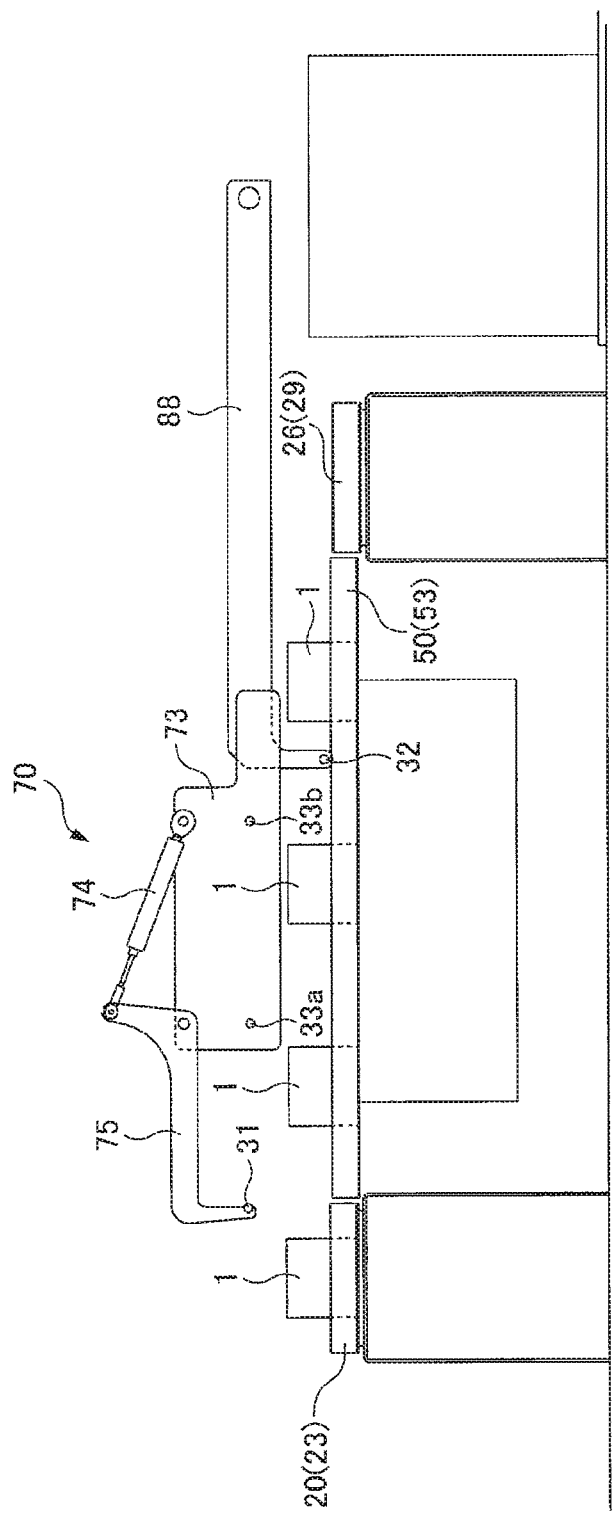
FIG. 22 is a side view showing general configuration of the pusher driving system of the relay device, illustrating change in the state of the pusher driving system over time.

Then, as illustrated in FIGS. 9 and 22, the second pusher 32 is disposed on the upstream side of the plurality of objects 1 (namely, article group) disposed on each junction passage 52. Specifically, the second pusher 32 (see FIG. 21) having been in a stand-by state at a high position above the objects 1 disposed on the junction passage 52 of the relay conveying section 50 is lowered while moving in the second reverse direction D2b (see FIG. 22), after the second relay pusher 33b is moved in the second reverse direction D2b to be spaced from the objects 1 on the junction passage 52. By this, the second pusher 32 is disposed at such a position as to be able to make contact with the objects 1 on the junction passage 52, on the upstream side (namely, the second reverse direction D2b side) of the objects 1, without making contact with the second relay pusher 33b.

Figure 10:
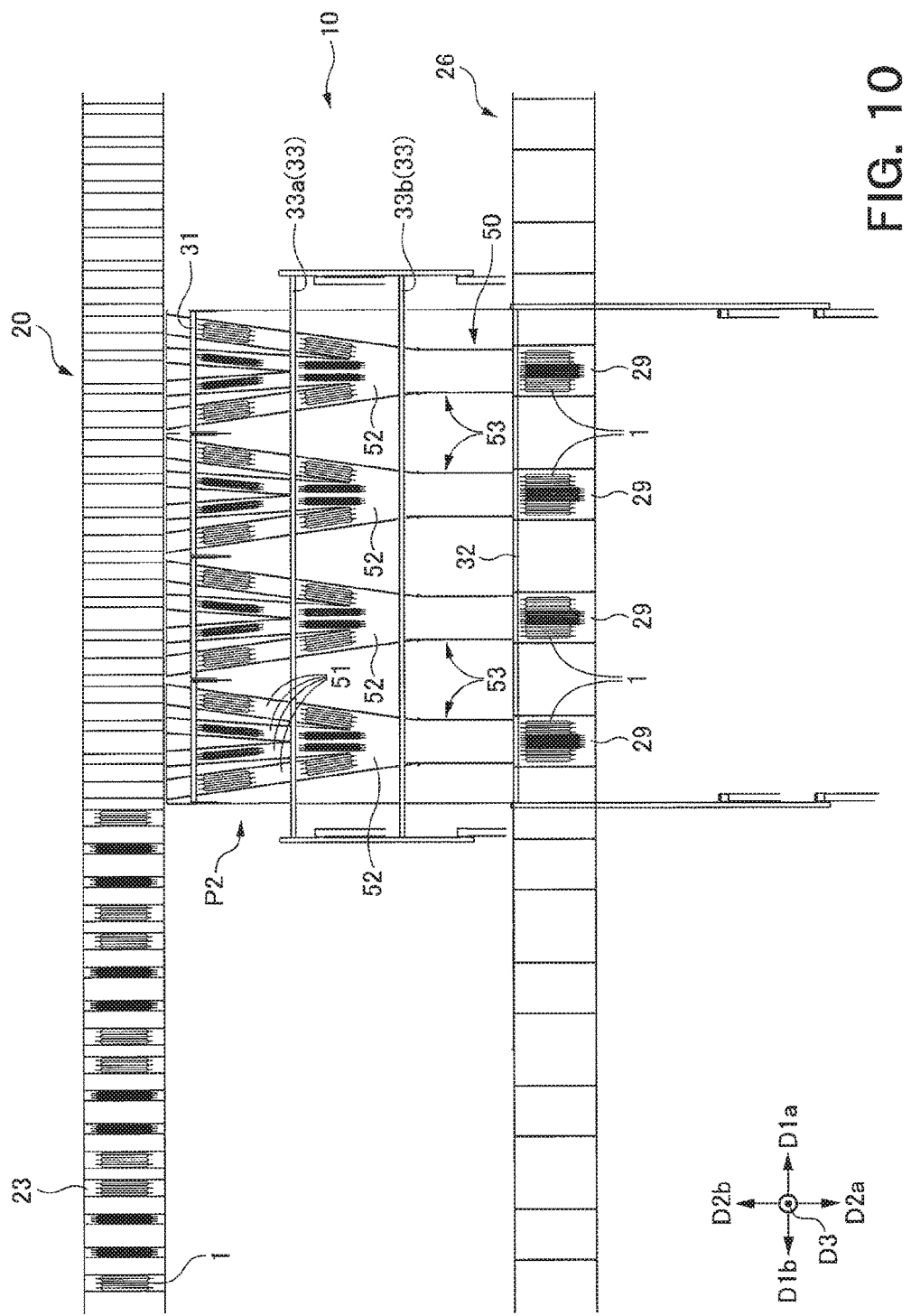
FIG. 10 is a plan view showing general configuration of the relay device according to one embodiment of the present invention, illustrating change in the state of the relay device over time.
Figure 23:
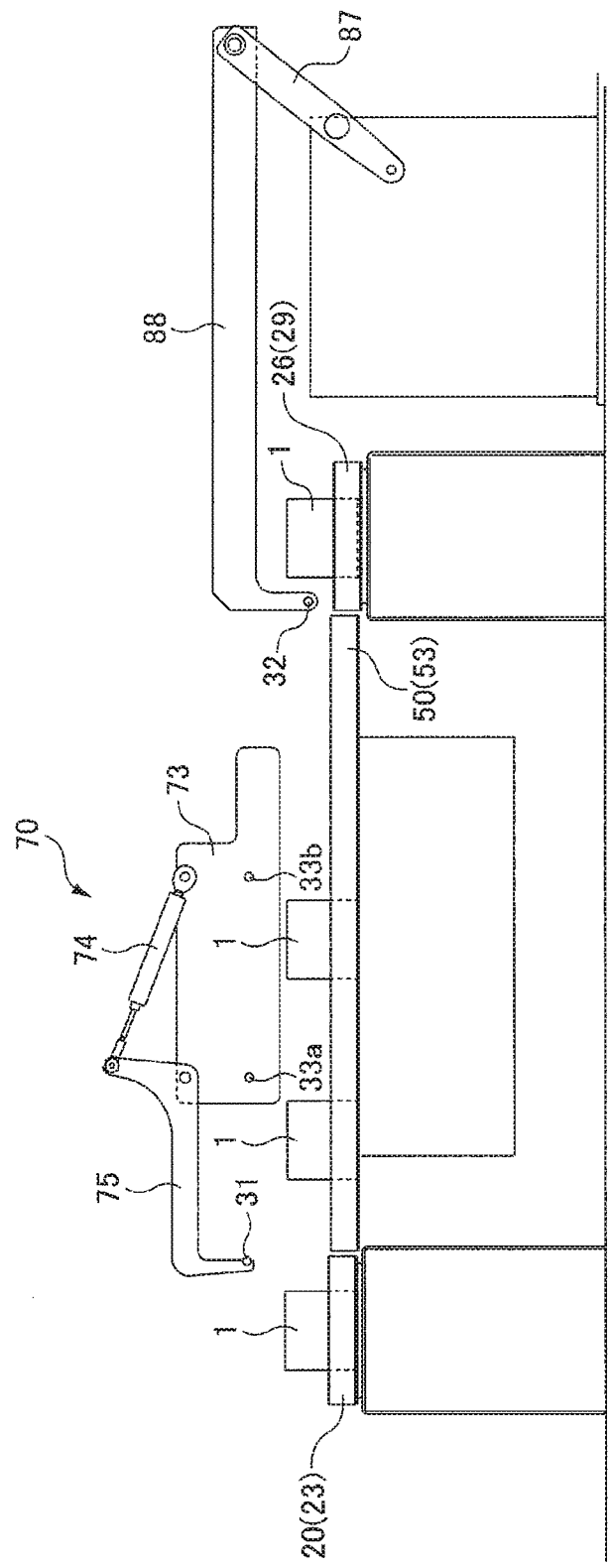
FIG. 23 is a side view showing general configuration of the pusher driving system of the relay device, illustrating change in the state of the pusher driving system over time.

Then, as shown in FIGS. 10 and 23, the plurality of objects 1 on the junction passage 52 are pushed in the second forward direction D2a by the second pusher 32, and moved to the corresponding assembly section 29.

Note that the relay conveying section 50, the first pusher 31 and the relay pushers 33 keep the state of being disposed in the second synchronous conveying position P2 as shown in FIGS. 9 and 10, at least during the period from the step of disposing the second pusher 32 on the upstream side of the objects 1 on the junction passages 52 (see FIGS. 9, 21 and 22) to the completion of the step of disposing the objects 1 on the assembly sections 29 (see FIGS. 10 and 23).

<Intermittent Conveying Step>

Figure 11:
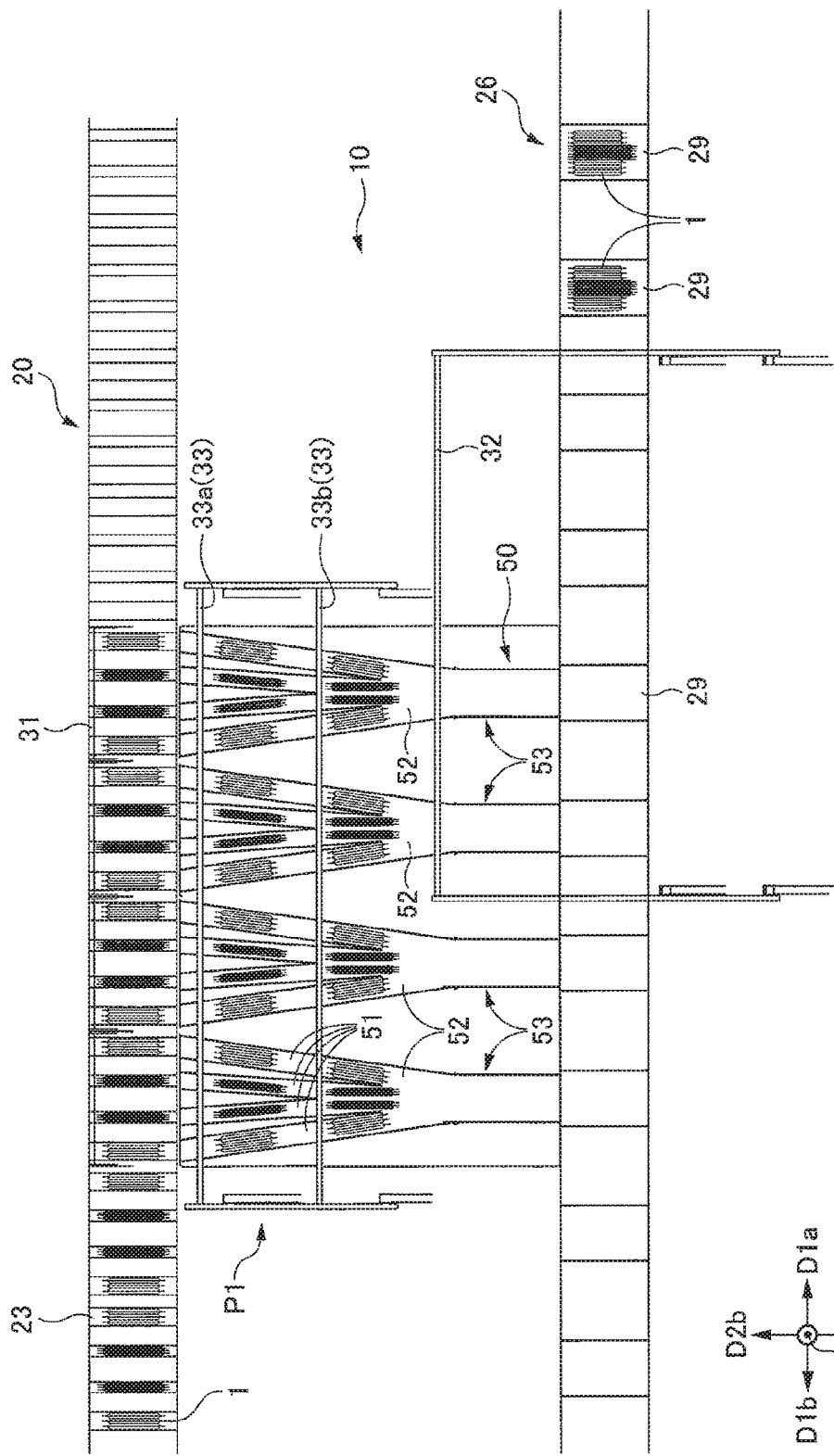
FIG. 11 is a plan view showing general configuration of the relay device according to one embodiment of the present invention, illustrating change in the state of the relay device over time.

Then, as shown in FIG. 11, the article group (namely, a plurality of objects 1) disposed on the assembly sections 29 of the second conveying section 26 is intermittently transferred in the first forward direction D1a, and sent to a packaging device (not shown) provided at a later stage.

In addition, the relay conveying section 50, the first pusher 31 and the relay pushers 33 are moved in the first reverse direction D1b, and returned from the second synchronous conveying position P2 to the first synchronous conveying position P1. Besides, the first pusher 31 and the relay pushers 33 are moved in the second reverse direction D2b, and are respectively disposed on the upstream side of the corresponding objects 1.

Then, the aforementioned steps described using FIGS. 8 to 11 and FIGS. 20 to 23 are conducted repeatedly, whereby the objects 1 to be conveyed are continuously sent from the first conveying section 20 to the second conveying section 26 through the relay conveying section 50. Specifically, each device performs the following predetermined operations repeatedly, whereby the objects 1 are continuously sent from the first conveying section 20 to the second conveying section 26 through the relay conveying section 50.

The first conveying section 20 is conveying the plurality of objects 1 in the first forward direction D1a at a constant speed. In addition, the relay conveying section 50 performs repeatedly a step S1 of moving from the first synchronous conveying position P1 to the second synchronous conveying position P2, a step S2 of standing by at the second synchronous conveying position P2, and a step S3 of moving from the second synchronous conveying position P2 to the first synchronous conveying position P1. Besides, the second conveying section 26 performs repeatedly a step S11 of stopping each assembly section 29 and standing by, and a step S12 of moving each assembly section 29 in the first forward direction D1a. In addition, the first pusher 31 and the relay pushers 33 (namely, the first relay pusher 33a and the second relay pusher 33b) are performing repeatedly a step S21 of moving in the first forward direction D1a at such a height position as to be able to make contact with the objects 1, a step S22 of rising to such a height position as not to make contact with the objects 1 while moving in the first reverse direction D1b, and a step S23 of being lowered to such a position as to make contact with the objects 1 while moving in the first reverse direction D1b. Besides, the second pusher 32 repeats a step S31 of moving in the first forward direction D1a at such a height position as to be able to make contact with the objects 1, a step S32 of rising to such a height position as not to make contact with the objects 1 while moving in the first reverse direction D1b, a step S33 of standing by at such a height position as not to make contact with the objects 1, and a step S34 of being lowered to such a height position as to make contact with the objects 1 while moving in the first reverse direction D1b.

Each of the aforementioned steps is realized by a process in which the aforementioned steps conducted by the first conveying section 20, the relay conveying section 50, the second conveying section 26, the first pusher 31, the second pusher 32 and the relay pushers 33 are performed at appropriate timings.

As has been described above, according to the relay device 10 in this embodiment, the plurality of objects 1 to be conveyed can be appropriately transferred from the first conveying section 20 to the second conveying section 26 through the relay conveying section 50 having the plurality of introducing passages 51.

Note that while a case where the objects 1 to be conveyed are transferred from the first conveying section 20 to the second conveying section 26 through all the introducing passages 51 possessed by each relay conveying passage 53 has been described in the above embodiment, all the introducing passages 51 may not necessarily be used for conveying the objects 1. For example, the objects 1 may be transferred from the first conveying section 20 to the second conveying section 26 through only three of the four introducing passages 51 possessed by each relay conveying passage 53. In this case, it is sufficient that the objects 1 to be conveyed are conveyed by the first conveying section 20 in a state in which the objects 1 are disposed in only the accommodating spaces 23 corresponding to three of the four introducing passages 51 possessed by each relay conveying passage 53.

In this way, by only regulating the number of the accommodating spaces 23 on which the objects 1 are actually placed to thereby change the number of the introducing passages 51 to be used for conveying the objects 1, it is possible to change flexibly and easily the number of the objects 1 transferred to each assembly section 29. In addition, the objects 1 of various sizes and kinds can be appropriately transferred from the first conveying section 20 to the second conveying section 26 through the relay conveying section 50. Thus, even if the number, size or kind of the objects 1 to be conveyed is changed, replacement of constituent elements of the conveying device is needless, or it is only necessary to replace a reduced number of elements, so that the relay device 10 in this embodiment is very high in utility.

In addition, by using the first pusher 31, the second pusher 32 and the relay pushers 33, the objects 1 to be conveyed can be gradually and reliably transferred from the first conveying section 20 to the second conveying section 26 divisionally at a plurality of stages. Particularly, by separating from each other the first pusher driver 70 for driving the first pusher 31 and the relay pushers 33 and the second pusher driver 85 for driving the second pusher 32, the operation of the first pusher 31 and the relay pushers 33 and the operation of the second pusher 32 can be performed separately and independently from each other. As a result, the timing of pushing out the objects 1 can be set finely and flexibly, and it is possible to shorten the stand-by time of the objects 1 and thereby to transfer the objects 1 from the first conveying section 20 to the second conveying section 26 in a short time.

In addition, by composing a driving system for the first pusher 31 and a driving system for the relay pushers 33 of a common first pusher driver 70, it is possible to reliably synchronize the operations of the first pusher 31 and the relay pushers 33 and thereby to prevent accidents such as collision between the pushers, while reducing the cost.

Besides, by providing the relay pushers 33 separately from the first pusher 31 and the second pusher 32, the plurality of objects 1 which are disposed separately from one another can be reliably assembled at the relay conveying section 50. By this, the objects 1 can be disposed on each accommodating space 23 in a mutually separated state at the first conveying section 20, and an operation of disposing the objects 1 on the accommodating spaces 23 can be simplified. Particularly, even in the case where a plurality of kinds of objects 1 must be conveyed by the first conveying section 20, the objects 1 can be disposed on separate accommodating spaces 23 on a kind basis, and, therefore, not only the objects 1 can be easily placed on each accommodating space 23, but also a mistake in disposing the objects 1 on each accommodating space 23 can be effectively prevented. In addition, by conveying the plurality of objects 1 through the introducing passages 51 and the junction passages 29 of the relay conveying section 50, the plurality of objects 1 can be assembled reliably and appropriately. Besides, the plurality of objects 1 in an appropriately assembled state can be loaded on each assembly section 29 reliably. Further, since it is unnecessary to provide a separate device for assembling the plurality of objects 1 to be conveyed, a reduction in the overall size of the device and a reduction in cost can be contrived.

Note that while the plurality of objects 1 (namely, article group) disposed on each assembly section 29 are conveyed toward the packaging device (not shown) in the above embodiment, the second conveying section 26 may convey the plurality of objects 1 toward, for example, a device for other use than packaging.

The present invention is not limited to the aforementioned embodiment and modifications. For example, each of the elements of the aforementioned embodiment and modifications may be modified variously. In addition, modes including other constituent elements than the aforementioned constituent elements are also embraced in the present invention. Besides, modes including some constituent elements included in an embodiment of the present invention and some constituent elements included in another embodiment are also embraced in the present invention. Therefore, constituent elements included in the aforementioned embodiment and modifications and those included in other embodiments of the present invention than the aforementioned may be combined with each other, and modes according to such combinations are also embraced in the embodiments of the present invention. In addition, the effects of the present invention are not limited to the aforementioned effects, and peculiar effects according to specific configurations of each embodiment can also be displayed. Thus, various additions, modifications and partial eliminations can be applied to the elements described in the claims, the specification, the abstract and the drawings, without departing from the scope of the technical thought and gist of the present invention.

For example, the relay pushers 33 are provided in the relay device 10 according to the aforementioned embodiment, the relay pushers 33 may be omitted. In this case, the objects 1 transferred from the first conveying section 20 to the relay conveying section 50 by the first pusher 31 are transferred from the relay conveying section 50 to the second conveying section 26 by the second pusher 32. In this case, the configuration of the relay conveying section 50, the moving ranges and moving timings of the first pusher 31 and the second pusher 32, and the sizes and positions of each accommodating space 23 and each assembly section 29 are adjusted appropriately.

The invention claimed is:

1. A relay device comprising:
   a first conveying section that conveys a plurality of objects to be conveyed, continuously in a forward direction of a first direction;
   a second conveying section that conveys a plurality of assembly sections, intermittently in the forward direction of the first direction;
   a relay conveying section provided between the first conveying section and the second conveying section with respect to a second direction perpendicular to the first direction;
   a relay driving section that moves the relay conveying section in the forward direction and a reverse direction of the first direction;
   a first pusher that moves two or more of the plurality of objects conveyed by the first conveying section, in a forward direction of the second direction, so as to dispose the two or more objects on the relay conveying section; and
   a second pusher that moves the two or more objects in the forward direction of the second direction after the two or more objects are disposed on the relay conveying section by the first pusher, so as to dispose the two or more objects on one or more of the plurality of assembly sections,
   wherein the relay driving section moves the relay conveying section in the forward direction of the first direction, at a same speed as a speed at which the plurality of objects are conveyed in the forward direction of the first direction by the first conveying section, at least while the first pusher is moving the two or more objects in the forward direction of the second direction.

2. The relay device according to claim 1, wherein:
the relay conveying section has a plurality of introducing passages,
the first pusher disposes the two or more objects on the plurality of introducing passages,
the second pusher moves the two or more objects in the forward direction of the second direction after the two or more objects are disposed on the plurality of introducing passages, so as to dispose the two or more objects on one or more of the plurality of assembly sections, and
the relay driving section moves the plurality of introducing passages in the forward direction of the first direction, at a same speed as a speed at which the plurality of objects are moved in the forward direction of the first direction by the first conveying section, at least while the first pusher is moving the two or more objects in the forward direction of the second direction.

3. The relay device according to claim 2, further comprising a relay pusher that moves the two or more objects disposed on the plurality of introducing passages, in the forward direction of the second direction.

4. The relay device according to claim 3, further comprising a first pusher driver that moves the first pusher in the second direction and in a height direction perpendicular to each of the first direction and the second direction, wherein:
while the first pusher is moved in the forward direction of the second direction, the first pusher driver disposes the first pusher at a position in the height direction where the first pusher makes contact with the two or more objects, and
while the first pusher is moved in a reverse direction of the second direction, the first pusher driver raises the first pusher above the two or more objects and then lowers the first pusher to a position below height of the two or more objects.

5. The relay device according to claim 3, wherein the first pusher and the relay pusher are connected with each other and operate in conjunction with each other.

6. The relay device according to claim 5, further comprising a first pusher driver that moves the first pusher and the relay pusher in the second direction and in a height direction perpendicular to each of the first direction and the second direction, wherein:
while the first pusher and the relay pusher are moved in the forward direction of the second direction, the first pusher driver disposes the first pusher and the relay pusher at positions in the height direction such that the first pusher makes contact with two or more objects and the relay pusher makes contact with other two or more of the objects, and
while the first pusher and the relay pusher are moved in a reverse direction of the second direction, the first pusher driver raises the first pusher and the relay pusher above the two or more objects and then lowers the first pusher and the relay pusher to positions below height of the two or more objects.

7. The relay device according to claim 3, further comprising a first pusher driver that moves the first pusher and the relay pusher in the second direction and in a height direction perpendicular to each of the first direction and the second direction, wherein:

while the first pusher and the relay pusher are moved in the forward direction of the second direction, the first pusher driver disposes the first pusher and the relay pusher at positions in the height direction such that the first pusher makes contact with two or more objects and the relay pusher makes contact with other two or more of the objects, and
while the first pusher and the relay pusher are moved in a reverse direction of the second direction, the first pusher driver raises the first pusher and the relay pusher above the two or more objects and then lowers the first pusher and the relay pusher to positions below height of the two or more objects.

8. The relay device according to any one of claim 3, wherein the first pusher and the relay pusher are connected to the relay conveying section and are moved in an integrated fashion, together with the relay conveying section, with respect to the first direction.

9. The relay device according to claim 3, wherein:
the relay conveying section further has a junction passage where the plurality of introducing passages merge,
the relay pusher assembles the two or more objects disposed on the plurality of introducing passages, onto the junction passage, so as to dispose the two or more objects together, and
the second pusher moves the two or more objects disposed together on the junction passage, in the forward direction of the second direction so as to dispose the two or more objects together on one of the plurality of assembly sections.

10. The relay device according to claim 9, further comprising a first pusher driver that moves the first pusher in the second direction and in a height direction perpendicular to each of the first direction and the second direction, wherein:
while the first pusher is moved in the forward direction of the second direction, the first pusher driver disposes the first pusher at a position in the height direction where the first pusher makes contact with the two or more objects, and
while the first pusher is moved in a reverse direction of the second direction, the first pusher driver raises the first pusher above the two or more objects and then lowers the first pusher to a position below height of the two or more objects.

11. The relay device according to claim 9, wherein the first pusher and the relay pusher are connected with each other and operate in conjunction with each other.

12. The relay device according to claim 11, further comprising a first pusher driver that moves the first pusher and the relay pusher in the second direction and in a height direction perpendicular to each of the first direction and the second direction, wherein:
while the first pusher and the relay pusher are moved in the forward direction of the second direction, the first pusher driver disposes the first pusher and the relay pusher at positions in the height direction such that the first pusher makes contact with two or more objects and the relay pusher makes contact with other two or more of the objects, and
while the first pusher and the relay pusher are moved in a reverse direction of the second direction, the first pusher driver raises the first pusher and the relay pusher above the two or more objects and then lowers the first pusher and the relay pusher to positions below height of the two or more objects.

13. The relay device according to claim 9, further comprising a first pusher driver that moves the first pusher and the relay pusher in the second direction and in a height direction perpendicular to each of the first direction and the second direction, wherein:

while the first pusher and the relay pusher are moved in the forward direction of the second direction, the first pusher driver disposes the first pusher and the relay pusher at positions in the height direction such that the first pusher makes contact with two or more objects and the relay pusher makes contact with other two or more of the objects, and while the first pusher and the relay pusher are moved in a reverse direction of the second direction, the first pusher driver raises the first pusher and the relay pusher above the two or more objects and then lowers the first pusher and the relay pusher to positions below height of the two or more objects.

14. The relay device according to any one of claim 9, wherein the first pusher and the relay pusher are connected to the relay conveying section and are moved in an integrated fashion, together with the relay conveying section, with respect to the first direction.

15. The relay device according to claim 2, further comprising a first pusher driver that moves the first pusher in the second direction and in a height direction perpendicular to each of the first direction and the second direction, wherein:

while the first pusher is moved in the forward direction of the second direction, the first pusher driver disposes the first pusher at a position in the height direction where the first pusher makes contact with the two or more objects, and while the first pusher is moved in a reverse direction of the second direction, the first pusher driver raises the first pusher above the two or more objects and then lowers the first pusher to a position below height of the two or more objects.

16. The relay device according to claim 1, further comprising a first pusher driver that moves the first pusher in the second direction and in a height direction perpendicular to each of the first direction and the second direction, wherein:

while the first pusher is moved in the forward direction of the second direction, the first pusher driver disposes the first pusher at a position in the height direction where the first pusher makes contact with the two or more objects, and while the first pusher is moved in a reverse direction of the second direction, the first pusher driver raises the first pusher above the two or more objects and then lowers the first pusher to a position below height of the two or more objects.

17. The relay device according to claim 16, further comprising a second pusher driver that moves the second pusher in the second direction and in a height direction perpendicular to each of the first direction and the second direction, wherein:

while the second pusher is moved in the forward direction of the second direction, the second pusher driver disposes the second pusher at a position in the height direction such that the second pusher makes contact with the two or more objects, and while the second pusher is moved in a reverse direction of the second direction, the second pusher driver raises the second pusher above the two or more objects and then lowers the second pusher to a position below height of the two or more objects.

18. The relay device according to claim 1, wherein:

the first conveying section has a plurality of side guides that are disposed so as to leave space between the plurality of side guides in the first direction, and each of the plurality of side guides extends in the second direction, each of the plurality of objects is disposed on an accommodating space partitioned by adjacent ones of the plurality of side guides, and while the two or more objects are moved by the first pusher, the plurality of side guides guide the two or more objects in the forward direction of the second direction.

19. The relay device according to claim 1, wherein:

the relay driving section moves the relay conveying section in the first direction so as to dispose the relay conveying section at a first synchronous conveying position and at a second synchronous conveying position downstream of the first synchronous conveying position with respect to the forward direction of the first direction, while the relay conveying section is moved from the first synchronous conveying position to the second synchronous conveying position, the first pusher disposes the two or more objects on the relay conveying section, and the second pusher moves the two or more objects in the forward direction of the second direction so as to dispose the two or more objects on one or more of the plurality of assembly sections, in a state in which the relay conveying section is disposed at the second synchronous conveying position.

\* \* \* \* \*